United States Patent
Yamashita et al.

(10) Patent No.: US 6,909,891 B2
(45) Date of Patent: Jun. 21, 2005

(54) MOBILE TERMINAL, AND AUTOMATIC REMOTE CONTROL SYSTEM AND AUTOMATIC REMOTE CONTROL METHOD

(75) Inventors: Atsushi Yamashita, Osaka (JP); Teruaki Ata, Osaka (JP); Kiyomi Sakamoto, Ikoma (JP); Hiroyuki Hamada, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 10/013,682

(22) Filed: Dec. 13, 2001

(65) Prior Publication Data

US 2002/0072356 A1 Jun. 13, 2002

(30) Foreign Application Priority Data

Dec. 13, 2000 (JP) ......................................... 2000-379203

(51) Int. Cl.⁷ ................................................. H04M 3/00
(52) U.S. Cl. ........................ 455/420; 455/418; 455/419; 455/456.3
(58) Field of Search ................................. 455/420, 418, 455/419, 456.1, 456.3, 406, 466

(56) References Cited

U.S. PATENT DOCUMENTS

| | | | | |
|---|---|---|---|---|
| 5,915,026 A | * | 6/1999 | Mankovitz | .................. 455/419 |
| 6,393,297 B1 | * | 5/2002 | Song | ........................... 455/466 |
| 2002/0068544 A1 | * | 6/2002 | Barzilay et al. | ............. 455/406 |

FOREIGN PATENT DOCUMENTS

| | | |
|---|---|---|
| JP | 11-107592 | 4/1999 |
| JP | 11-355453 | 12/1999 |
| JP | 2000-227336 | 8/2000 |

* cited by examiner

*Primary Examiner*—Emmanuel L. Moise
*Assistant Examiner*—Huy D Nguyen
(74) *Attorney, Agent, or Firm*—Wenderoth, Lind & Ponack, L.L.P.

(57) ABSTRACT

A mobile terminal 31 detects its position, speed, and direction, and judges a control requirement based on the detected position, speed, and direction. Based on the judgment, the mobile terminal 31 transmits a message corresponding to the control requirement that has been satisfied to a control terminal 33. The control terminal 33 judges a message requirement based on the received message. Based on the judgment, the control terminal 33 transmits a control command corresponding to the message requirement that has been satisfied to a control target appliance 34. The control target appliance 34 executes an operation by following the received command.

19 Claims, 20 Drawing Sheets

FIG. 7

| | CONTROL REQUIREMENT | MESSAGE |
|---|---|---|
| (a) | LINEAR DISTANCE BETWEEN TERMINAL AND RECEIVING SYSTEM < D1 | "APPROACHING" |
| (b) | LINEAR DISTANCE BETWEEN TERMINAL AND RECEIVING SYSTEM > D1 | "GOING AWAY" |
| (c) | LINEAR DISTANCE BETWEEN TERMINAL AND RECEIVING SYSTEM > D1 IS SATISFIED DURING TIME t1 | "GOING AWAY" |

FIG. 8

| | CONTROL REQUIREMENT | MESSAGE |
|---|---|---|
| (d) | DISTANCE FROM TERMINAL TO DESTINATION < D2 AND LINEAR DISTANCE BETWEEN DESTINATION AND RECEIVING SYSTEM < d1 | "APPROACHING" |
| (e) | LINEAR DISTANCE BETWEEN TERMINAL AND RECEIVING SYSTEM > D3 | "GOING AWAY" |
| (f) | LINEAR DISTANCE BETWEEN TERMINAL AND RECEIVING SYSTEM > D3 IS SATISFIED DURING TIME t2 | "GOING AWAY" |

FIG. 9

| | CONTROL REQUIREMENT | MESSAGE |
|---|---|---|
| (g) | TIME LEFT TO GO TO DESTINATION < T1 AND LINEAR DISTANCE BETWEEN DESTINATION AND RECEIVING SYSTEM < d2 | "APPROACHING" |
| (h) | LINEAR DISTANCE BETWEEN TERMINAL AND RECEIVING SYSTEM > D4 | "GOING AWAY" |
| (i) | LINEAR DISTANCE BETWEEN TERMINAL AND RECEIVING SYSTEM > D4 IS SATISFIED DURING TIME t3 | "GOING AWAY" |

FIG. 10

| | CONTROL REQUIREMENT | MESSAGE |
|---|---|---|
| (j) | PREDICTED ARRIVAL TIME − SCHEDULED ARRIVAL TIME > $\Delta t$<br>AND<br>LINEAR DISTANCE BETWEEN DESTINATION AND RECEIVING SYSTEM < d3 | "LATE" |
| (k) | PREDICTED ARRIVAL TIME − SCHEDULED ARRIVAL TIME < $-\Delta t$<br>AND<br>LINEAR DISTANCE BETWEEN DESTINATION AND RECEIVING SYSTEM < d3 | "TOO EARLY" |
| (l) | PREDICTED ARRIVAL TIME − SCHEDULED ARRIVAL TIME > $-\Delta t$<br>AND<br>PREDICTED ARRIVAL TIME − SCHEDULED ARRIVAL TIME < $\Delta t$<br>AND<br>LINEAR DISTANCE BETWEEN DESTINATION AND RECEIVING SYSTEM < d3 | "IN TIME" |

FIG. 11

| | CONTROL REQUIREMENT | MESSAGE |
|---|---|---|
| (m) | SCHEDULED ARRIVAL TIME − CURRENT TIME = T2 AND DISTANCE FROM CURRENT POSITION TO DESTINATION > D5 | "LATE" |
| (n) | SCHEDULED ARRIVAL TIME − CURRENT TIME = T2 AND DISTANCE FROM CURRENT POSITION TO DESTINATION < D6 | "TOO EARLY" |
| (o) | SCHEDULED ARRIVAL TIME − CURRENT TIME = T2 AND D6 < DISTANCE FROM CURRENT POSITION TO DESTINATION < D5 | "IN TIME" |

FIG. 12

| | MESSAGE REQUIREMENT | CONTROL COMMAND |
|---|---|---|
| (A) | TERMINAL A "APPROACHING" OR TERMINAL B "APPROACHING" | START OPERATION SET TEMPERATURE AT 28 °C SET OPERATION MODE TO COOL |
| (B) | TERMINAL A "GOING AWAY" AND TERMINAL B "GOING AWAY" | CHECK WHETHER AIR CONDITIONER IS OPERATING STOP IF OPERATING |

FIG. 13

| | MESSAGE REQUIREMENT | CONTROL TARGET APPLIANCE | CONTROL COMMAND GROUP |
|---|---|---|---|
| (C) | TERMINAL A "APPROACHING" OR TERMINAL B "APPROACHING" | AIR CONDITIONER | START OPERATION<br>SET TEMPERATURE AT 28 °C<br>SET OPERATION MODE TO COOL |
| (D) | TERMINAL A "GOING AWAY" AND TERMINAL B "GOING AWAY" | AIR CONDITIONER | CHECK WHETHER AIR CONDITIONER IS OPERATING<br>STOP IF OPERATING |
| (E) | TERMINAL A "LATE" | VIDEO RECORDER | CHECK PRESET RECORDING |
| (F) | TERMINAL A "TOO EARLY" | VIDEO RECORDER | CANCEL PRESET RECORDING |

MOBILE TERMINAL, AND AUTOMATIC REMOTE CONTROL SYSTEM AND AUTOMATIC REMOTE CONTROL METHOD

BACKGROUND OF THE INVENTION

1. Field of the Invention

The present invention relates to automatic remote control systems for appliances and, more specifically, to a system for automatically and remotely controlling an appliance based on a positional relation between a mobile terminal and the appliance and other factors.

2. Description of the Background Art

In recent years, there have been increasing expectations for home appliances equipped with a computer and connected to an in-house network, which are so-called "Internet home appliances". Such Internet home appliances include, for example, refrigerators or microwave ovens capable of displaying a recipe downloaded over the Internet and working accordingly.

Also, with tremendous advances in mobile terminals such as cellular phones and PDAs, such cellular phones having not only a network function but also a camera function, a navigating function, and a function of playing games have been suggested.

Furthermore, as an integrated form of the above Internet home appliances and mobile terminals, suggested is a system where a user uses a mobile terminal for operating a home appliance at home through a network. With this system, the user away from home can remotely operate an air conditioner at home by using a cellular phone, for example.

In the above remote operation, however, the user has to specify an appliance to be controlled, an operation to be carried out thereon, etc. For this purpose, the user has to do burdensome operations such as specifying which appliance to use, when to control the appliance, and which type of control to carry out. Moreover, the user may possibly forget such required operations.

SUMMARY OF THE INVENTION

Therefore, an object of the present invention is to a mobile terminal and a system capable of automatically controlling an appliance based on a position, speed and direction of the mobile terminal without requiring any operation by a user.

The present invention has the following features to attain the object above.

A first aspect of the present invention is directed to a mobile terminal capable of communicating through a network with a receiving system including at least one control target appliance and of remotely controlling the control target appliance by transmitting a message to the receiving system. The mobile terminal includes:

a message transmission rule storing part for storing at least one message transmission rule indicating a correspondence between a control requirement for remotely controlling the control target appliance and a message to be transmitted for remote control;

a motion parameter detecting part for detecting various motion parameters indicating a current state of motion;

a control requirement judging part for judging whether the control requirement in the message transmission rule has been satisfied based on the motion parameters detected by the motion parameter detecting part; and transmitting part for transmitting, when the control requirement judging part judges that the control requirement in the message transmission rule has been satisfied, the message corresponding to the control requirement to the receiving system by reading the message from the message transmission rule storage part.

In the above first aspect, the mobile terminal transmits, based on the motion parameters, a message for operating the control target appliance. Here, the motion parameter is a parameter indicating how the mobile terminal moves, such as a position, speed, direction, etc., of the mobile terminal. That is, according to the above first aspect, the message is automatically transmitted based on the current position, speed, and direction of the mobile terminal. Therefore, it is possible to provide a mobile terminal capable of automatically controlling the control target appliance without any operation by the user. Such mobile terminal can relieve the user of burdensome operation of the appliance, and prevent the appliance from being left unoperated. For example, if the user carrying the mobile terminal is approaching home, the mobile terminal detects this approaching, and automatically controls the air conditioner at home to bring a comfortable room temperature before the user comes back. On the contrary, if the user is going away from home, the mobile terminal detects this going-away, and automatically switches off the air conditioner at home.

According to a second aspect, in the first aspect, the mobile terminal further includes a setting part for setting a destination specified by a user, wherein the control requirement judging part judges whether the control requirement has been satisfied only when a position of the receiving system matches the destination set by the setting part.

In the second aspect, the user can set the destination. Therefore, the mobile terminal can judge whether the destination is somewhere in the receiving system. That is, even if the user happens to be approaching the receiving system that is not the destination, the control target appliance can be prevented from being operated contrary to user's intention.

According to a third aspect, in the second aspect, the mobile terminal further includes:

a cartographic information storage part for storing cartographic information; and a route searching part for searching a route on a map from a starting point to the destination set by the setting part, wherein the control requirement judging part judges whether the control requirement in the message transmission rule has been satisfied based on the motion parameters and the route found by the route searching part.

In the above third aspect, the control requirement is judged based on the motion parameters and the found route. Therefore, the control requirement can be judged more correctly than a case where the control requirement is judged only based on the motion parameters. That is, judgment is made based on the route actually taken by the user. Therefore, compared with a case where judgment is made based on the linear distance to the destination calculated from the motion parameters, the control requirement can be judged more correctly, and also the control target appliance can be controlled more correctly.

According to a fourth aspect, in the third aspect, the control requirement includes a predetermined distance, and the control requirement judging part calculates a remaining distance on the found route from a current position to the destination, and judges whether the control requirement has been satisfied based on whether the remaining distance becomes shorter than the predetermined distance included in the control requirement.

In the above fourth aspect, the mobile terminal uses the distance along the route from the current position to the destination as a decision parameter, which is a parameter for judging the control requirement. Therefore, the control requirement can be judged more correctly, compared with a case where the linear distance from the current position to the destination is used as the decision parameter. That is, judgment is made based on the route actually taken by the user. Therefore, compared with a case where judgment is made based on the linear distance to the destination, the control requirement can be judged more correctly, and also control target appliance can be controlled more correctly.

According to a fifth aspect, in the third aspect, the control requirement includes a predetermined time, the control requirement judging part predicts a time left to go to the destination while taking the found route, and judges whether the control requirement has been satisfied based on whether the predicted time is shorter than the predetermined time included in the control requirement.

In the above fifth aspect, the mobile terminal predicts a time left to go to the destination via the found route, and uses the predicted time as the decision parameter. Therefore, compared with a case where the linear distance from the current position to the destination is used as the decision parameter, control can be made more correctly. That is, judgment is made based on the time to go to the destination via the route actually taken by the user. Therefore, compared with a case where judgment is made based on the linear distance to the destination, the control requirement can be judged more correctly, and also the control target appliance can be controlled more correctly.

According to a sixth aspect, in the third aspect, the setting part sets the destination and a scheduled arrival time to the destination both specified by the user, the control requirement includes a predetermined distance and a predetermined time, and the control requirement judging part calculates a distance from a current position to the destination on the found route, calculates a time difference between a current time and the scheduled arrival time set by the setting part, and judges whether the control requirement has been satisfied based on whether the calculated distance and the calculated time difference respectively have a predetermined relation with the predetermined distance and the predetermined time included in the control requirement.

In the above sixth aspect, the mobile terminal uses, as the decision parameters, the distance between the current position to the destination and the difference between the current time and the scheduled arrival time. Thus, the mobile terminal can judge not only whether it is approaching or going away, but also whether it will be late or in time. Therefore, according to the above sixth aspect, the mobile terminal can judge more complex control requirement, and carry out more complex control over the control target appliance.

According to a seventh aspect, in the third aspect, the setting part sets the destination and a scheduled arrival time to the destination both specified by the user, the control requirement includes a predetermined time, and the control requirement judging part predicts an arrival time to the destination while taking the found route, calculates a time difference between the predicted arrival time and the scheduled arrival time set by the setting part, and judges whether the control requirement has been satisfied based on whether the calculated time difference has a predetermined relation with the predetermined time included in the control requirement.

In the above seventh aspect, the mobile terminal predicts an arrival time to the destination via the route, and uses, as the decision parameter, the difference between the predicted arrival time and the scheduled arrival time. Thus, according to the above seventh aspect, the mobile terminal can judge not only whether it is approaching or going away, but also whether it will be late or in time. Therefore, the mobile terminal can judge more complex control requirement, and carry out more complex control over the control target appliance.

According to an eighth aspect, in the first aspect, the mobile terminal further includes:

an output part for outputting to a user a visual and/or audio inquiry about whether the transmitting part transmits the message; and an answer receiving part for receiving an answer from the user to the inquiry outputted by the output part, wherein the transmitting part transmits the message when the user answers that the message should be transmitted.

In the above eighth aspect, the mobile terminal inquires of the user whether the message should be transmitted. If the user determines that control is unnecessary, the mobile terminal does not send any message. Therefore, according to the above eighth aspect, it is possible to prevent the control target appliance from being operated contrary to user's intention.

A ninth aspect of the present invention is directed to an automatic remote control system in which a predetermined message is transmitted through a network from a mobile terminal to a receiving system for remotely controlling a control target appliance included the receiving system, the mobile terminal includes:

a message transmission rule storing part for storing at least one message transmission rule indicating a correspondence between a control requirement for remotely controlling the control target appliance and a message to be transmitted for remote control;

a motion parameter detecting part for detecting various motion parameters indicating a current state of motion;

a control requirement judging part for judging whether the control requirement in the message transmission rule has been satisfied based on the motion parameters detected by the motion parameter detecting part; and a transmitting part for transmitting, when the control requirement judging part judges that the control requirement in the message transmission rule has been satisfied, the message corresponding to the control requirement to the receiving system by reading the message from the message transmission rule storage part, and the receiving system includes:

a receiving part for receiving the message from the mobile terminal; and an executing part for making the control target appliance execute an operation based on the message received by the receiving part.

In the above ninth aspect, the mobile terminal automatically transmits the message based on the current position, speed, and direction of the mobile terminal. Therefore, it is possible to automatically control the appliance without any operation by the user.

According to a tenth aspect, in the ninth aspect, the executing part includes:

a control command transmission rule storage part for storing a control command transmission rule for determining, based on the message received by the receiving part, a control command indicating an instruction for operating the control target appliance;

a control command determining part for determining the control command corresponding to the message received by the receiving part by following the control command transmission rule; and an execution control part for making the control target appliance execute the operation based on the control command determined by the control command determining part.

In the above tenth aspect, a plurality of types of control target appliances can be controlled without requiring different instructions held in the mobile terminal for different control target appliances. That is, only a common message is enough to be held in the mobile terminal for any type of the control target appliance. Thus, the user can easily register the message transmission rule, and the amount of data of the message transmission rule stored in the mobile terminal can be reduced.

According to an eleventh aspect, in the tenth aspect, the message transmitted from the transmitting part is provided with identification information for identifying the mobile terminal that transmitted the message, the control command transmission rule is so described as that the control command is determined based on the message and the identification information both received by the receiving part, and the control command determining part the control command corresponding the message and the identification information both received by the receiving part by following the control command transmission rule.

In the above eleventh aspect, the control command is determined based on not only the message but also the mobile terminal that transmitted the message. Therefore, a plurality of mobile terminals can be identified. That is, such requirement for transmitting the control command can be set as that "messages have been received from a plurality of mobile terminals". Thus, more complex control can be carried out when there are a plurality of users carrying the mobile terminal.

According to a twelfth aspect, in the ninth aspect, the mobile terminal further includes setting part for setting a destination specified by a user, the control requirement judging part judges whether the control requirement has been satisfied when a position of the receiving system matches the destination set by the setting part.

In the above twelfth aspect, the user can set the destination. Therefore, the mobile terminal can judge whether the destination is somewhere in the receiving system. That is, even if the user happens to be approaching the receiving system that is not the destination, the control target appliance can be prevented from being operated contrary to user's intention.

According to a thirteenth aspect, in the twelfth aspect, the mobile terminal further includes:

a cartographic information storage part for storing cartographic information; and a route searching part for searching a route on a map from a starting point to the destination set by the setting part, wherein the control requirement judging part judges whether the control requirement in the message transmission rule has been satisfied based on the motion parameters and the route found by the route searching part.

In the above thirteenth aspect, the control requirement is judged based on the motion parameters and the found route. Therefore, the control requirement can be judged more correctly than a case where the control requirement is judged only based on the motion parameters. That is, judgment is made based on the route actually taken by the user. Therefore, compared with a case where judgment is made based on the linear distance to the destination calculated from the motion parameters, the control requirement can be judged more correctly, and also the control target appliance can be controlled more correctly.

According to a fourteenth aspect, in the thirteenth aspect, the control requirement includes a predetermined distance, and the control requirement judging part calculates a remaining distance on the found route from a current position to the destination, and judges whether the control requirement has been satisfied based on whether the remaining distance becomes shorter than the predetermined distance included in the control requirement.

In the above fourteenth aspect, the mobile terminal uses the distance along the route from the current position to the destination as a decision parameter, which is a parameter for judging the control requirement. Therefore, the control requirement can be judged more correctly, compared with a case where the linear distance from the current position to the destination is used as the decision parameter. That is, judgment is made based on the route actually taken by the user. Therefore, compared with a case where judgment is made based on the linear distance to the destination, the control requirement can be judged more correctly, and also control target appliance can be controlled more correctly.

According to a fifteenth aspect, in the thirteenth aspect, the control requirement includes a predetermined time, and the control requirement judging part predicts a time left to go to the destination while taking the found route, and judges whether the control requirement has been satisfied based on whether the predicted time is shorter than the predetermined time included in the control requirement.

In the above fifteenth aspect, the mobile terminal predicts a time left to go to the destination via the found route, and uses the predicted time as the decision parameter. Therefore, compared with a case where the linear distance from the current position to the destination is used as the decision parameter, control can be made more correctly. That is, judgment is made based on the time to go to the destination via the route actually taken by the user. Therefore, compared with a case where judgment is made based on the linear distance to the destination, the control requirement can be judged more correctly, and also the control target appliance can be controlled more correctly.

According to a sixteenth aspect, in the thirteenth aspect, the setting part sets the destination and a scheduled arrival time to the destination both specified by the user, the control requirement includes a predetermined distance and a predetermined time, and the control requirement judging part calculates a distance from a current position to the destination on the found route, calculates a time difference between a current time and the scheduled arrival time set by the setting part, and judges whether the control requirement has been satisfied based on whether the calculated distance and the calculated time difference respectively have a predetermined relation with the predetermined distance and the predetermined time included in the control requirement.

In the above sixteenth aspect, the mobile terminal uses, as the decision parameters, the distance between the current position to the destination and the difference between the current time and the scheduled arrival time. Thus, the mobile terminal can judge not only whether it is approaching or going away, but also whether it will be late or in time. Therefore, according to the above sixth aspect, the mobile terminal can judge more complex control requirement, and carry out more complex control over the control target appliance.

According to a seventeenth aspect, in the thirteenth aspect, the setting part sets the destination and a scheduled arrival time to the destination both specified by the user, the control requirement includes a predetermined time, the control requirement judging part predicts an arrival time to the destination while taking the found route, calculates a time difference between the predicted arrival time and the scheduled arrival time set by the setting part, and judges whether the control requirement has been satisfied based on whether the calculated time difference has a predetermined relation with the predetermined time included in the control requirement.

In the above seventeenth aspect, the mobile terminal predicts an arrival time to the destination via the route, and uses, as the decision parameter, the difference between the predicted arrival time and the scheduled arrival time. Thus, according to the above seventeenth aspect, the mobile terminal can judge not only whether it is approaching or going away, but also whether it will be late or in time. Therefore, the mobile terminal can judge more complex control requirement, and carry out more complex control over the control target appliance.

According to an eighteenth aspect, in the ninth aspect, an output part for outputting to a user a visual and/or audio inquiry about whether the transmitting part transmits the message; and an answer receiving part for receiving an answer from the user to the inquiry outputted by the output part, wherein the transmitting part transmits the message when the user answers that the message should be transmitted.

In the above eighteenth aspect, the mobile terminal inquires of the user whether the message should be transmitted. If the user determines that control is unnecessary, the mobile terminal does not send any message. Therefore, according to the above eighteenth aspect, it is possible to prevent the control target appliance from being operated contrary to user's intention.

A nineteenth aspect of the present invention is directed to an automatic control method for remotely controlling a control target appliance included a receiving system by transmitting a predetermined message through a network from a mobile terminal to the receiving system, the mobile terminal previously storing at least one message transmission rule indicating a correspondence between a control requirement for remotely controlling the control target appliance and the message to be transmitted for remote control, the method comprising the steps of:

detecting, by the mobile terminal, various motion parameters indicating a current state of motion;

judging, by the mobile terminal, whether the control requirement in the message transmission rule has been satisfied based on the detected motion parameters;

transmitting, by the mobile terminal, when it is judged that the control requirement in the message transmission rule has been satisfied, the message corresponding to the control requirement to the receiving system by reading the message from the message transmission rule;

making, by the receiving system, the mess the control target appliance execute an operation based on the message received from the mobile terminal.

In the above nineteenth aspect, the message is automatically transmitted based on the current position, speed, and direction of the mobile terminal. Therefore, it is possible to automatically control the appliance without any operation by the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a table showing example message transmission rules in a case where a linear distance between the current position of the mobile terminal 31 and a receiving system is used as a decision parameter;

FIG. 8 is a table showing example message transmission rules in a case where a distance along a route from the current position of the mobile terminal 31 and the destination and a linear distance between the destination and the receiving system are used as the decision parameters;

FIG. 9 is a table showing example message transmission rules in a case where a time left to go to the destination and the linear distance between the destination and the receiving system are used as the decision parameters;

FIG. 10 is a table showing example message transmission rules in a case where a difference between a predicted arrival time and a scheduled arrival time and the linear distance between the destination and the receiving system are used as the decision parameters;

FIG. 11 is a table showing example message transmission rules in a case where a difference between the scheduled arrival time and the current time and the distance between the current position and the destination are used as the decision parameters;

FIG. 12 is a table showing example control command rules in a case where the control target appliance 34 is an air conditioner at home;

FIG. 13 is a table showing example control command rules in a case where the control target appliances 34 is an air conditioner and a video recorder both at home;

DESCRIPTION OF THE PREFERRED EMBODIMENT

Figure 1:
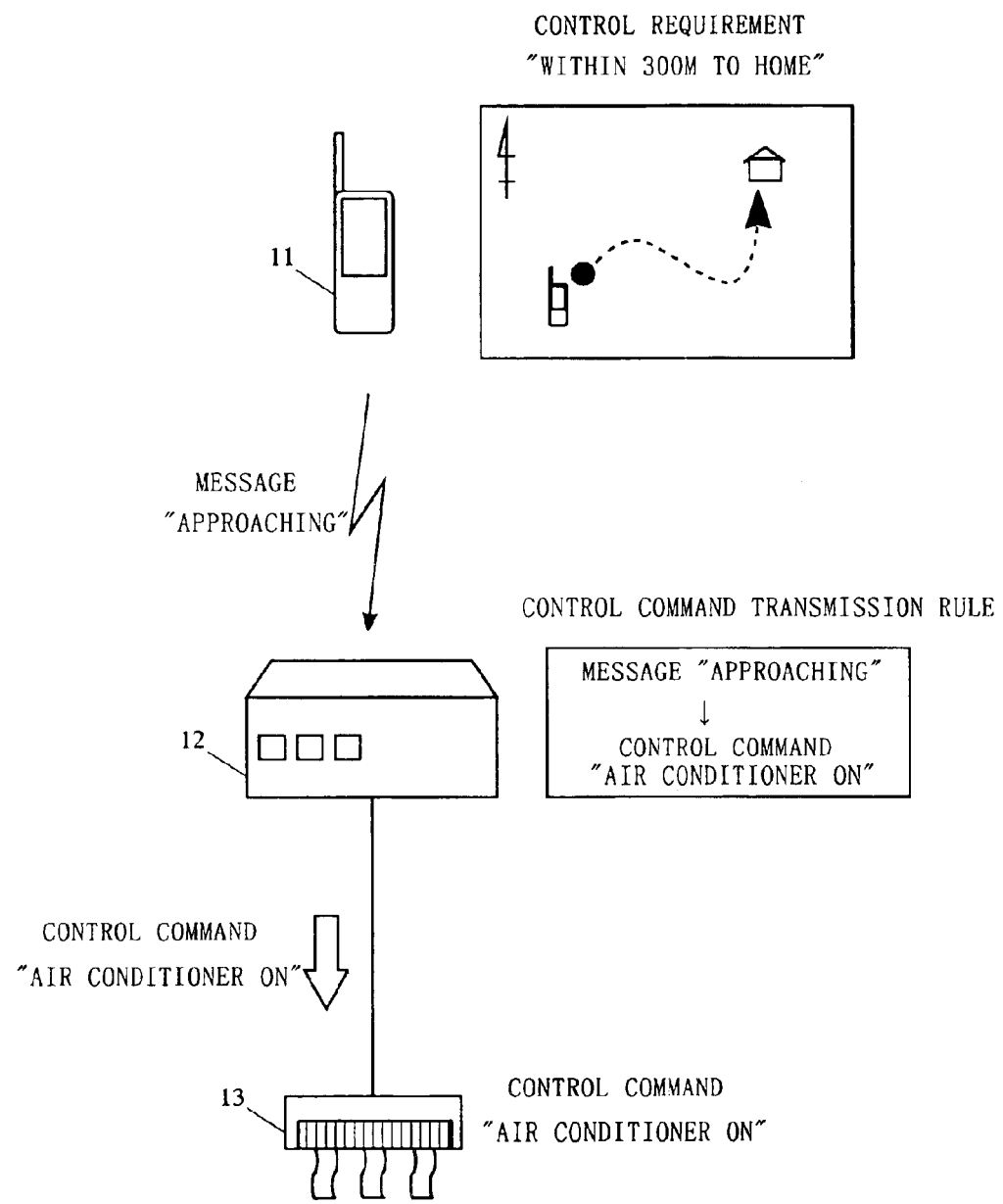
FIG. 1 is an illustration showing an outline of one embodiment of the present invention with a single mobile terminal and a single control target appliance.

Described first is an outline of one embodiment of the present invention. FIG. 1 is an illustration of an outline of the present embodiment of the present invention with a single mobile terminal and a single control target appliance. In advance, a mobile terminal 11 holds a message transmission rule indicating a correspondence between a "control requirement" that triggers a control terminal 12 to carry out control and a "message" transmitted for reporting the control terminal 12 that the control requirement has been satisfied. The message transmission rule has, for example, a control requirement "a distance from the current position to home is within 300 m" stored in correspondence with a message "approaching". Also, in advance, the control terminal 12 holds a control command transmission rule indicating a correspondence between the above message and a "control command" transmitted for controlling the appliance based on the above message. The control command transmission rule has, for example, the message "approaching" stored in correspondence with a control command "turn the air conditioner ON".

After the above preparation, a user starts going out with the mobile terminal 11. The mobile terminal 11 checks whether the control requirement has been satisfied based on the position, speed, and direction of the mobile terminal 11 that are detected at predetermined time intervals. Based on the control requirement "the distance from the current position to home is within 300 m", the mobile terminal 11 first calculates the distance from the current position to home. If the distance is within 300 m, it is judged that the control requirement has been satisfied. The mobile terminal 11 then transmits the message corresponding to the satisfied control requirement to the control terminal 12 through a network. In FIG. 1, the mobile terminal 11 transmits the message "approaching" to the control terminal 12. The control terminal 12 then determines the control command corresponding the received message "approaching", and transmits the determined control command to a control target appliance 13. In FIG. 1, the control terminal 12 selects the control command "turn the air conditioner ON" corresponding to the message "approaching", and transmits the control command to the air conditioner. Finally, the control target appliance 13 executes the received control command. In FIG. 1, the air conditioner, which is the control target appliance 13, starts the air-conditioning operation at home. With this processing, the appliance can be automatically controlled without requiring any operation by the user.

Figure 2:
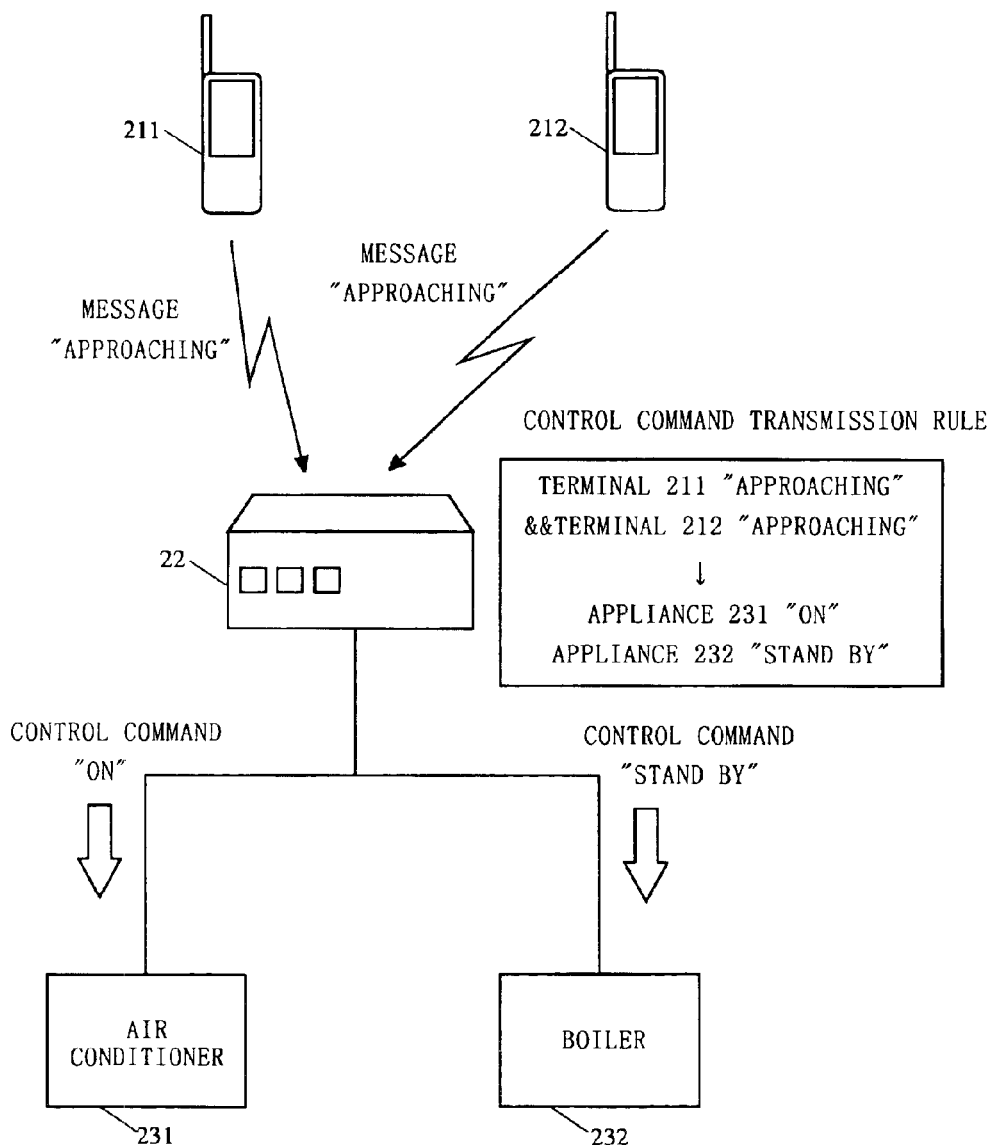
FIG. 2 is an illustration showing an outline of the embodiment of the present invention with a plurality of mobile terminals and a plurality of control target appliances.

FIG. 2 is an illustration showing an outline of the embodiment of the present invention with a plurality of mobile terminals and a plurality of control target appliances. In this case, the mobile terminals 211 and 212 and the control target appliances 231 and 232 have respective identifiers. In FIG. 2, the control terminal 22 holds a message requirement "when receiving the message 'approaching' from the mobile terminal 211 and the message 'approaching' from the mobile terminal 212". As such, when there are a plurality of mobile terminals, the control terminal 22 may transmit a control command on condition that it receives a plurality of messages from the mobile terminals. Also, in FIG. 2, the control terminal 22 holds a control command "ON" for the control target appliance 231, and a control command "STAND BY" for the control target appliance 232. As such, when there are a plurality of control target appliances, the control terminal 22 may transmit a plurality of control commands for a single message requirement.

Note that the above description made with reference to FIGS. 1 and 2 should be used for better understanding the concept of the present invention, and should not unreasonably restrict the scope of the present invention.

Figure 3:
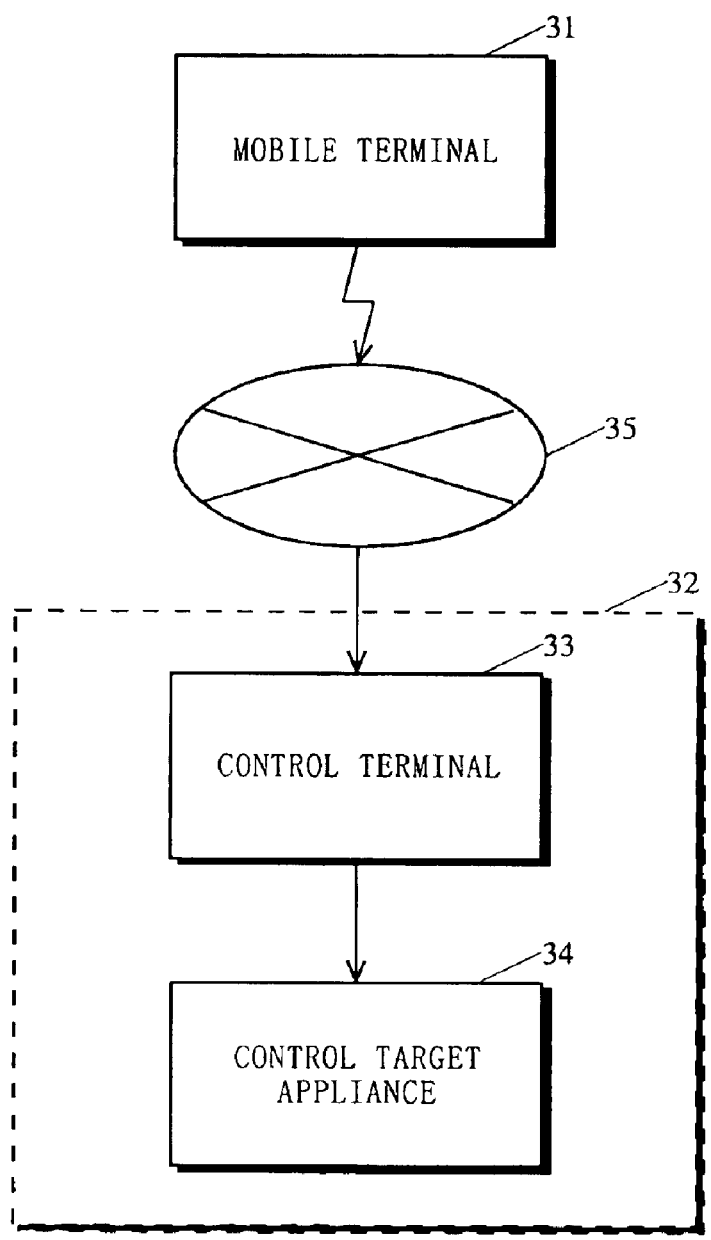
FIG. 3 is a block diagram showing the structure of an automatic remote control system according to the embodiment of the present invention.

FIG. 3 is a block diagram showing the structure of an automatic remote control system according to the embodiment of the present invention. In FIG. 3, the automatic remote control system according to the present embodiment includes a mobile terminal 31, a receiving system 32, and a network 35. Furthermore, the receiving system 32 includes a control terminal 33 and a control target appliance 34. Although not shown, the automatic remote control system includes a plurality of mobile terminals other than the mobile terminal 31, and also a plurality of control target appliances other than the control target appliance 34. In a system according to another embodiment, the mobile terminal 31 and the control target appliance 34 may directly communicate with each other through the network 35, not via the control terminal 33. In such system, the message may be the one simply indicating that the control requirement has been satisfied, such as "approaching". In other words, the system may be the one where the mobile terminal 31 transmits a message simply indicating that the control requirement has been satisfied, and the control target appliance 34 converts the received message into a control command. Alternatively, the message may be the one directly making the control target appliance 34 operate, such as "start operation". In other words, the system may be the one where the mobile terminal 31 transmits a message directly making the control target appliance 34 operate, and the control target appliance 34 operates based on the received message. Described in detail below are the mobile terminal 31, the control terminal 33, and the control target appliance 34.

The mobile terminal 31 judges the control requirement based on the current position, etc., and, based on the judgment result, transmits a message to the control terminal 33. Note that the mobile terminal 31 may have only a function of detecting the current position, etc., or may be a multifunctional terminal such as having a navigation function capable of setting the destination and further searching for a route. Also, the mobile terminal 31 may be a dedicated device with the above functions embedded, or may be a general-purpose device such as a cellular phone, a PDA, a car navigation device, or any other device having the above functions.

The control terminal 33 selects a control command based on the message received from the mobile terminal 31, and then transmits the control command to the control target appliance 34. The control terminal 33 may be hardware with the above function included therein, or may be realized by installing control-function-programmed software on a computer connected to the control target appliance 34. In the latter case, the control software may be provided by a storage medium such as a floppy disk or a CD-ROM, or may be downloaded from a server via the Internet. In this sense, the "control terminal" hereinafter includes both hardware having the control function embedded therein and a computer having control-function-programmed software installed thereon.

The control target appliance 34 executes the control command received from the control terminal 33. The control target appliance 34 has a function of connecting the network 35 via the control terminal 33.

The mobile terminal 31, the control terminal 33, and the control target appliance 34 respectively have communications means. The mobile terminal 31 and the control terminal 33 are connected to each other via the network 35 such as a cellular phone circuit, the Internet, or others. The control terminal 33 and the control target appliance 34 are connected to each other via a wired or wireless LAN, for example.

Figure 4:
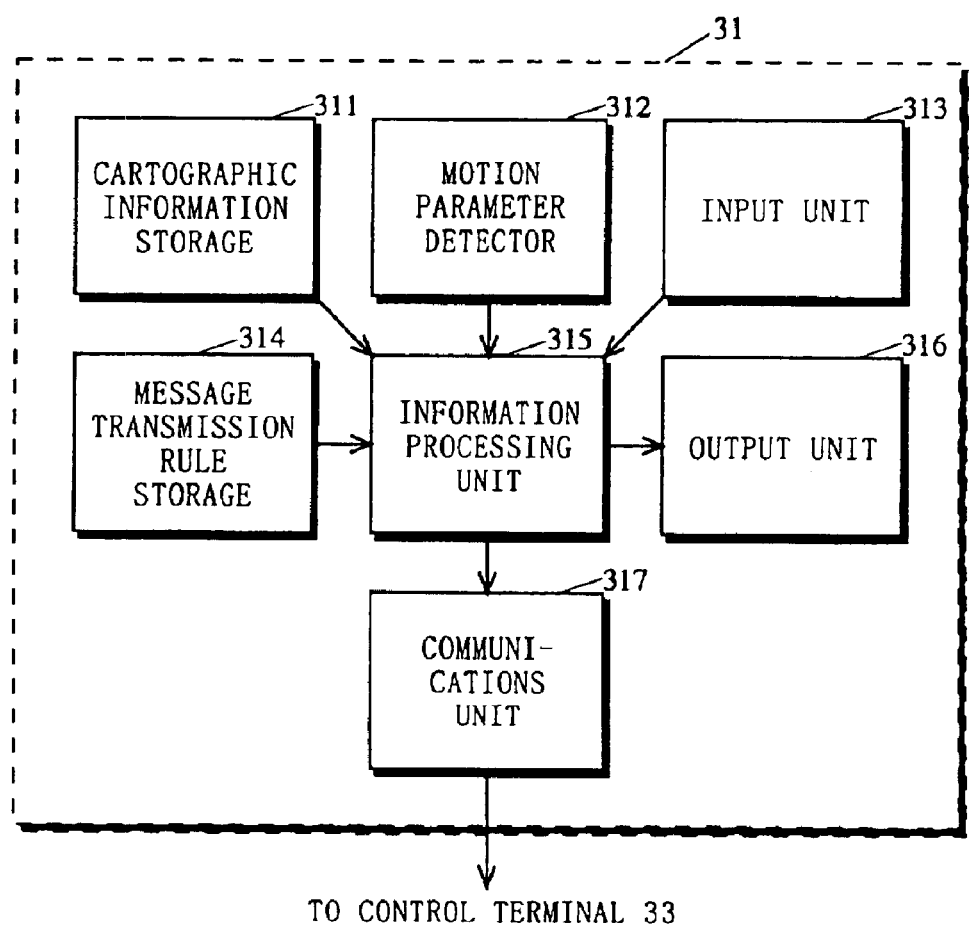
FIG. 4 is a block diagram showing the structure of a mobile terminal 31 shown in FIG. 3.

FIG. 4 is a block diagram showing the structure of the mobile terminal 31 shown in FIG. 3. The mobile terminal 31 includes a cartographic information storage 311, a motion parameter detector 312, an input unit 313, a message transmission rule storage 314, an information processing unit 315, an output unit 316, and a communications unit 317. Described below are the these respective components.

The cartographic information storage 311 is implemented by a volatile or non-volatile storage medium such as memory, a hard disk, CD-ROM, DVD-ROM, a memory card, or others, for storing cartographic data and data representing the position of the receiving system 32. Note that the cartographic data may be the one initially stored in the mobile terminal 31, or the one downloaded through communications as required. The cartographic data stored in the cartographic information storage 311 and the data representing the position of the receiving system 32 are outputted to the information processing unit 315.

The motion parameter detector 312 is implemented by a GPS, a radio beacon receiving device, a speed sensor, an absolute azimuth sensor, and/or others, for detecting a motion parameter of the mobile terminal 31. Here, the motion parameter is a parameter indicating how the mobile terminal moves, such as a position, speed, direction, etc., of the mobile terminal. The motion parameter detected by the motion parameter detector 312 is outputted to the information processing unit 315.

The input unit 313 is implemented by a mouse, a keyboard, a sound input device, or others, for inputting a destination and a scheduled arrival time to the destination that are specified by the user. The inputted data of the destination and the scheduled arrival time are outputted to the information processing unit 315. If the mobile terminal 31 has a function of checking whether to transmit the message, the input unit 313 is used for inputting the decision by the user as to whether to transmit the message. The inputted user's decision is outputted to the information processing unit 315.

The message transmission rule storage 314 is implemented by a volatile or non-volatile storage medium such as memory, a hard disk, CD-ROM, DVD-ROM, a memory card, or others, for storing a message transmission rule. The message transmission rule indicates a correspondence between a control requirement for message transmission to the control terminal 33, and a message to be transmitted to the control terminal 33 when the control requirement has been satisfied. Example message transmission rules are shown in FIGS. 7 to 10. The message transmission rule is outputted to the information processing unit 315.

The information processing unit 315 is implemented by a CPU, memory, or the like, for carrying out route search, parameter calculation, control requirement judgment, and other processing. Described in detail below is the operation carried out by the information processing unit 315.

First, the information processing unit 315 searches for a route from the current position to the destination based on the cartographic data of a relevant area stored in the cartographic information storage 311, the motion parameters of the mobile terminal 31 detected by the motion parameter detector 312, and the destination data inputted by the input unit 313. The found route is used for calculating a decision parameter, which will be described later. Also, based on the found route, the information processing unit 315 calculates a distance along the route from the current position to the destination and a time left to go to the destination. The calculated distance along the route to the destination and time left to go to the destination are used as decision parameters, which will be described later. Furthermore, based on the time left to go to the destination and the current time, the information processing unit 315 predicts an arrival time to the destination. The predicted arrival time is used for calculating a decision parameter, which will be described later.

Next, the information processing unit 315 calculates the decision parameter. Here, the decision parameter is a parameter for use in judging the control requirement. The type of decision parameter differs depending on the function of the mobile terminal 31, the type of the control target appliance 34, or the setting by the user. The decision parameter may be the motion parameter as described above or, for example, a linear distance between the current position of the mobile terminal 31 and the receiving system 32, a linear distance between the destination and the receiving system 32, a distance along the route from the current position of the mobile terminal 31 to the destination, the time left to go to the destination, a difference between the predicted arrival time and the scheduled arrival time, or others calculated from the motion parameter and/or the route. The linear distance between the current position of the mobile terminal 31 and the receiving system 32 is calculated from the data of the current position of the mobile terminal 31 detected by the motion parameter detector 312 and the data of the position of the receiving system 32 stored in the cartographic information storage 311. The linear distance between the destination and the receiving system 32 is calculated from the data of the position of the destination inputted by the input unit 313 and the data of the position of the receiving system 32 stored in the cartographic information storage 311. The distance along the route from the current position of the mobile terminal 31 to the destination is calculated from the cartographic data stored in the cartographic information storage 311 and the route found by the information processing unit 315. The time left to go to the destination is calculated from the route found by the information processing unit 315. The difference between the predicted arrival time and the scheduled arrival time is calculated from the arrival time predicted by the information processing unit 315 and the scheduled arrival time set by the input unit 313. The decision parameters calculated as in the above manner are used for judging the control requirement.

Furthermore, based on the calculated decision parameters and the message transmission rule stored in the message transmission rule storage 314, the information processing unit 315 decides whether the position of the mobile terminal 31, the destination, the route, or other factors, satisfies the control requirement. If the factor satisfies the control requirement, the information processing unit 315 selects the message corresponding to the satisfied control requirement. The selected message is outputted to the communications unit 317.

If the mobile terminal 31 has a function of checking, before message transmission, whether to output the message to the communications unit 317, the information processing unit 315 first reports to the user via the output unit 316 that the control requirement has been satisfied, and checks whether the message should be transmitted or not. The decision as to whether to transmit the message is inputted through the input unit 313 by the user. Based on the user's decision inputted through the input unit 313, the information processing unit 315 decides whether the selected message should be transmitted.

The output unit 316 is implemented by a display device, an sound output device, or others, for outputting an image or sound indicating that the control requirement has been satisfied when the information processing unit 315 has a function of checking whether the message is transmitted or not.

The communications unit 317 is implemented by a modem, an antenna, and the like, for transmitting the message outputted from the information processing unit 315 to the control terminal 33.

Figure 5:
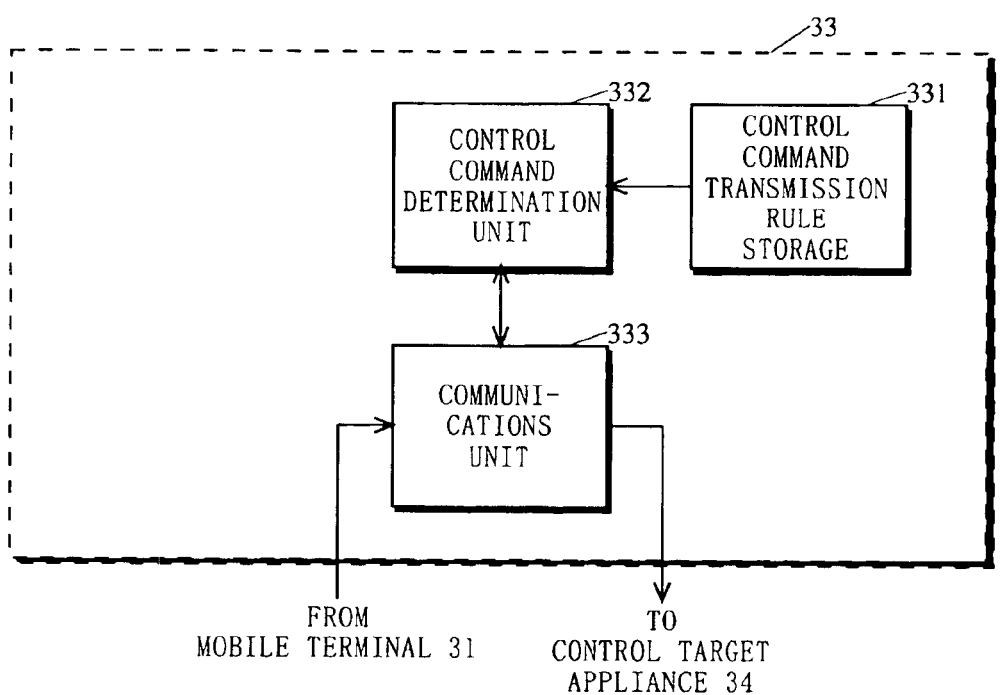
FIG. 5 is a block diagram showing the structure of a control terminal 33 shown in FIG. 3.

FIG. 5 is a block diagram showing the structure of the control terminal 33 shown in FIG. 3. The control terminal 33 includes a control command transmission rule storage 331, a control command determination unit 332, and a communications unit 333. Described in detail below are the respective components.

The control command transmission rule storage 331 is implemented by a volatile or non-volatile storage medium such as memory, a hard disk, CD-ROM, DVD-ROM, a memory card, or others, for storing a control command transmission rule. The control command transmission rule represents a correspondence between a message requirement for control command transmission to the control target appliance 34 and a control command to be transmitted to the control target appliance 34 when the message requirement has been satisfied. Example control command transmission rules are shown in FIGS. 12 and 13. The control command transmission rule is outputted to the control command determination unit 332.

The control command determination unit 332 determines the control command to be transmitted to the control target appliance 34 based on the message received by the communications unit 333 and the control command transmission rule stored in the control command transmission rule storage 331, and outputs the control command to the communications unit 333.

The communications unit 333 is implemented by a modem, an antenna, and the like, for receiving the message from the mobile terminal 31 and outputting it to the control command determination unit 332. Also, the communications unit 333 transmits the control command determined by the control command determination unit 332 to the control target appliance 34.

Figure 6:
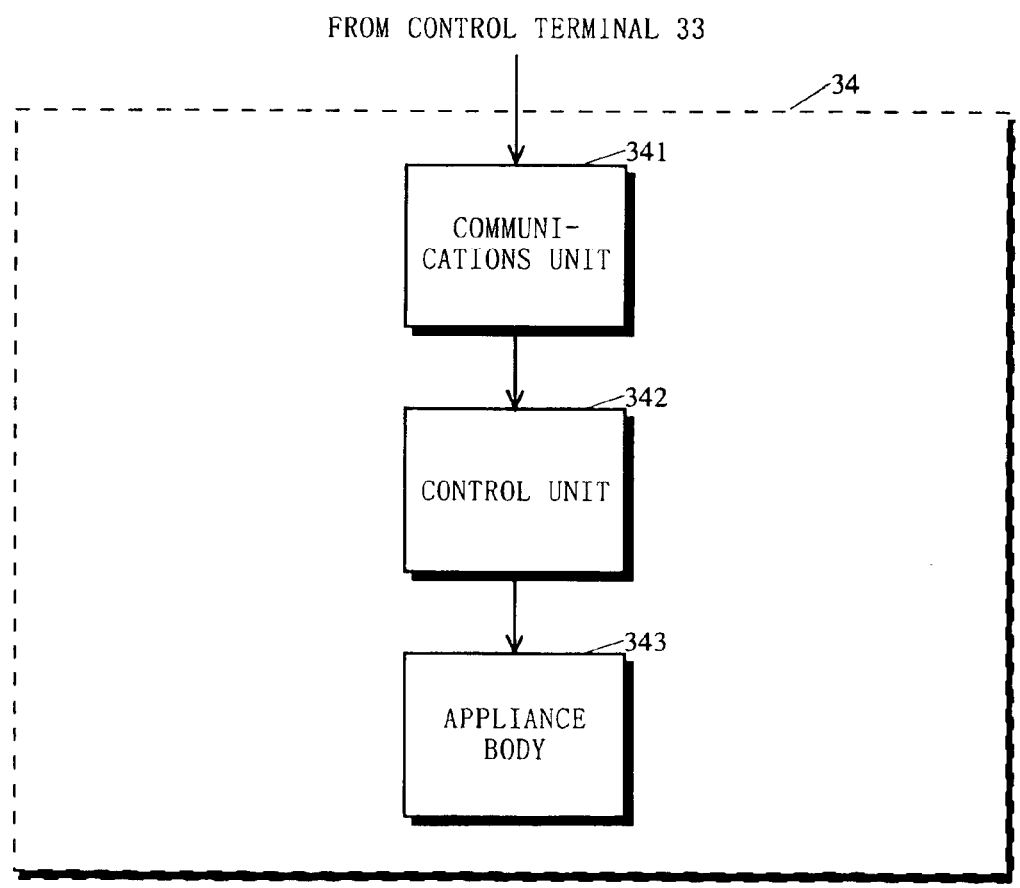
FIG. 6 is a block diagram showing the structure of a control target appliance 34 shown in FIG. 3.

FIG. 6 is a block diagram showing the structure of the control target appliance 34 shown in FIG. 3. The control target appliance 34 includes a communications unit 341, a control unit 342, and an appliance body 343. The communications unit 341 is implemented by a modem, an antenna, and the like, for receiving the control command from the control terminal 33 and outputting it to the control unit 342. The control unit 342 is implemented by a CPU, a microcomputer, memory, and others, for making the appliance body 343 execute the operation indicated by the control command received by the communications unit 341.

FIGS. 7 to 10 are tables showing example message transmission rules stored in the message transmission rule storage 314 shown in FIG. 4. The message transmission rule is set by providing a control requirement for message transmission in relation to an appropriate message. How to set the message transmission rule is shown in detail in FIG. 14. Here, one example of the decision parameter used for judging the control requirement is the linear distance between the current position of the mobile terminal 31 and the receiving system. If the mobile terminal 31 has a function of setting the destination and searching for a route, the decision parameters can be the linear distance between the destination and the receiving system 32, the distance along the route from the current position of the mobile terminal 31 and the destination, and the time left to go to the destination. Furthermore, if the scheduled arrival time to the destination is known, one example of the decision parameter is the difference between the predicted arrival time and the scheduled arrival time. On the other hand, example messages to be transmitted to the control terminal 33 are "approaching" and "going away". If the scheduled arrival time to the destination is known, example messages are "late", "too early", "in time". With reference to FIGS. 7 to 11, specific examples of the message transmission rule are described.

FIG. 7 is a table showing example message transmission rules in a case where a linear distance between the current position of the mobile terminal 31 and a receiving system 32 is used as a decision parameter. Note that, in this case, the mobile terminal 31 does not have to have the route search function. Therefore, the information processing unit 315 described with reference to FIG. 4 does not have to have the route search function. In FIG. 7, a message transmission rule (a) has a control requirement that the linear distance between the current position of the mobile terminal 31 and the receiving system 32 should be shorter than a predetermined distance D1. This control requirement indicates that the user enters into an area within the distance D1 from a prescribed point of the receiving system 32. The distance D1 is a threshold value for use in judging the control requirement, and set by the user. The message transmission rule (a) has a message "approaching".

A message transmission rule (b) has a control requirement that the linear distance between the current position of the mobile terminal 31 and the receiving system 32 should be longer than the distance D1. This control requirement indicates that the user gets out of the area within the distance D1 from the prescribed point of the receiving system 32. The message transmission rule (b) has a message "going away".

A message transmission rule (c) is an alternative to the message transmission rule (b), having the same message "going away". The message transmission rule (c) is provided because of the following reason. With the message transmission rule (b) used, when the mobile terminal 31 moves in the vicinity of the area within the linear distance D1 from the prescribed point of the receiving system 32, the mobile terminal 31 repeatedly sends the messages "approaching" and "going away", thereby causing the control target appliance 34 to carry out wasteful operations. To prevent such wasteful operations, the message transmission rule (c) is used, which has a control requirement that the control requirement of the message transmission rule (b) should be satisfied continuously for more than a predetermined time t1. The time t1 is a threshold value for use in judging the control requirement, and set by the user.

FIG. 8 is a table showing example message transmission rules in a case where a distance along a route from the current position of the mobile terminal 31 and the destination and a linear distance between the destination and the receiving system 32 are used as the decision parameters. In this case, the mobile terminal 31 has to have the route search function. In FIG. 8, a message transmission rule (d) has a control requirement that the distance along the route from the current position of the mobile terminal 31 to the destination should be shorter than a predetermined distance D2 and the linear distance between the destination and the receiving system 32 should be shorter than a predetermined distance d1. This control requirement indicates that the user enters into an area within the distance D2 from the receiving system 32 and the destination is the receiving system 32. The distance D2 and the distance d1 are threshold values used for judging the control requirement, and set by the user. The message transmission rule (d) has a message "approaching".

A message transmission rule (e) has a control requirement that the linear distance between the current position and the receiving system 32 should be longer than a predetermined distance D3. The distance D3 is a threshold value for judging the control requirement, and set by the user. The message transmission rule (e) has a message "going away".

A message transmission rule (f) is an alternative to the message transmission rule (e), having the same message "going away". The message transmission rule (e) has a control requirement that the control requirement of the message transmission rule (e) should be satisfied continuously for more than a predetermined time t2. The time t2 is a threshold value for use in judging the control requirement, and set by the user.

FIG. 9 is a table showing example message transmission rules in a case where a time left to go to the destination and the linear distance between the destination and the receiving system 32 are used as the decision parameters. In this case, the mobile terminal 31 has to have the route search function. In FIG. 9, a message transmission rule (g) has a control requirement that the time left to go to the destination should be shorter than a predetermined time T1 and the linear distance between the destination and the receiving system 32 should be shorter than a predetermined distance d2. This control requirement indicates that the user will arrive at the receiving system 32 within the time T1 and the destination is the prescribed point of the receiving system 32. The distance d2 and the time T1 are threshold values for use in judging the control requirement, and set by the user. The message transmission rule (g) has a message "approaching".

A message transmission rule (h) has a control requirement that the linear distance between the mobile terminal 31 and the receiving system 32 should be longer than a predetermined distance D4. The distance D4 is a threshold value for use in judging the control requirement, and set by the user. The message transmission rule (h) has a message "going away".

A message transmission rule (i) is an alternative to the message transmission rule (h), having the same message "going away ". The message transmission rule (i) has a control requirement that the control requirement of the message transmission rule (h) should be satisfied continuously for more than a predetermined time t3. The time t3 is a threshold value for use in judging the control requirement, and set by the user.

FIG. 10 is a table showing example message transmission rules in a case where the difference between the predicted arrival time and the scheduled arrival time and the linear distance between the destination and the receiving system 32 are used as the decision parameters. Note that, in this case, the scheduled arrival time has to be previously set by the user using the input unit 313. In FIG. 10, a message transmission rule (j) has a control requirement that the difference between the predicted arrival time and the scheduled arrival time should be longer than a predetermined time $\Delta t$ and the linear distance between the destination and the receiving system 32 should be shorter than a predetermined distance d3. This control requirement indicates that the user will be late for the scheduled arrival time by more than the time $\Delta t$ and the destination is the receiving system 32. The distance d3 and the time $\Delta t$ are threshold values for use in judging the control requirement, and set by the user. The message transmission rule (j) has a message "late".

A message transmission rule (k) has a control requirement that the difference between the predicted arrival time and the scheduled arrival time should be shorter than a predetermined time $-\Delta t$ and the linear distance between the destination and the receiving system 32 should be shorter than a predetermined distance d3. This control requirement indicates that the user will arrive at the destination at a time earlier than the scheduled arrival time by more than the time $\Delta t$ and the destination is the receiving system 32. The message transmission rule (k) has a message "too early".

A message transmission rule (l) has a control requirement that the distance between the predicted arrival time and the scheduled arrival time should be longer than the predetermined time $-\Delta t$ and shorter than the $\Delta t$ and the linear distance between the destination and the receiving system 32 should be shorter than the predetermined distance d3. This control requirement indicates that the user will arrive at the destination within the time $\Delta t$ before and after the scheduled arrival time and the destination is the receiving system 32. The message transmission rule (l) has a message "in time".

FIG. 11 is a table showing example message transmission rules in a case where a difference between the scheduled arrival time and the current time and the distance between the current position of the mobile terminal 31 and the destination are used as the decision parameters. Note that, in this case, the scheduled arrival time has to be previously set by the user. In FIG. 11, a message transmission rule (m) has a control requirement that the difference between the scheduled arrival time and the current time should be equal to a predetermined time T2 and the distance between the current position of the mobile terminal 31 and the destination should be longer than a predetermined distance D5. This control requirement indicates that, when the time left until the scheduled arrival time is equal to the predetermined time T2, the users current position is more than the distance D5 away from the destination. The time T2 and the distance D5 are threshold values for use in judging the control requirement, and set in advance. The message transmission rule (m) has a message "late".

A message transmission rule (n) has a control requirement that the difference between the scheduled arrival time and the current time should be equal to the time T2 and the distance from the current position of the mobile terminal 31 and the destination should be shorter than a predetermined distance D6. This control requirement indicates that, when the time left until the scheduled arrival time is equal to the time T2, the user s current position is less than the distance D6 away from the destination. The distance D6 is a threshold value for use in judging the control requirement, and is so set as to be shorter than the distance D5. The message transmission rule (m) has a message "too early".

A message transmission rule (o) has a control requirement that the difference between the scheduled arrival time and the current time should be equal to the predetermined time T2 and the distance from the current position of the mobile terminal 31 and the destination should be longer than the predetermined distance D6 and shorter than the distance D5. This control requirement indicates that, when the time left until the scheduled arrival time is equal to the time T2, the user's current position is within an area between the distance D6 and the distance D5 from the destination. The message transmission rule (o) has a message "in time".

As shown in FIG. 11, by setting the control requirement based on the time and the distance and calculating the distance from the current position to the destination and the time left until the scheduled arrival time as the decision parameters, it is possible to make a decision such as "late", "in time", or "too early". Moreover, with the control requirements of FIG. 11 used, the mobile terminal 31 calculates the distance from the current position to the destination only when the time left until the scheduled arrival time becomes T2. Therefore, the mobile terminal 31 does not have to calculate the distance from the current position to the destination at predetermined time intervals. In other words, by using the control requirements shown in FIG. 11, the control requirement judging processing can be simplified, and the processing load on the mobile terminal 31 can be reduced.

FIGS. 12 and 13 are tables showing example control command transmission rules stored in the control command transmission rule storage 331 shown in FIG. 5. Note that, in FIGS. 12 and 13, it is assumed that the number of possible mobile terminals connected to the control terminal 33 is two, a terminal A and a terminal B, and the terminal A is used by a user A and the terminal B is used by a user B. Described below are example control command transmission rules.

FIG. 12 is a table showing example control command rules in a case where the control target appliance 34 is an air conditioner at home. A control command transmission rule (A) has a message requirement that the message "approaching" should be received from the terminal A or the message "approaching" should be received from the terminal B. This message requirement indicates that either the user A or the user B is approaching home. Since there are two mobile terminals in FIG. 12, the message is provided with identification information indicating the terminal A or the terminal B. However, if there is a single mobile terminal, the message does not have to be provided with such identification information. Also, the control command transmission rule (A) has control commands "start operation", "set temperature at 28 degrees Celsius", and "set operation mode to cool". Therefore, if the message requirement of the control command transmission rule (A) has been satisfied, the control terminal 33 transmits to the air conditioner the control commands "start operation", "set temperature at 28 degrees Celsius", and "set operation mode to cool". As such, when either the user A or the user B is approaching home, the air conditioner automatically starts operation, setting the operation mode and the temperature.

A control command transmission rule (B) has a message requirement that the message "going away" should be received from the terminal A and the message "going away" should be received from the terminal B. This message requirement indicates that both the user A and the user B are going away from home. The control command transmission rule (B) has control commands "check whether the air conditioner is operating" and "stop if operating". Therefore, if the message requirement of the control command transmission rule (B) has been satisfied, the control terminal 33 transmits to the air conditioner the control commands "check whether the air conditioner is operating" and "stop if operating". As such, when both the user A and the user B are going away from home, the air conditioner automatically checks whether it has been switched off or not. If not switched off, the air conditioner stops operation.

FIG. 13 is a table showing example control command rules in a case where the control target appliances are an air conditioner and a video recorder at home. As shown in FIG. 13, with a plurality of control target appliances, the control command transmission rule includes, in addition to the message requirement and the control commands, information for identifying the control target appliances that should receive the respective control commands. In control command transmission rules (C) and (D), the control target appliance is the air conditioner. The message requirement and the control commands of the control command transmission rules (C) and (D) are identical to those of the control command transmission rules (A) and (B) described with reference to FIG. 12, and therefore not described herein. Described below are control command transmission rules (E) and (F)

In the control command transmission rules (E) and (F) the control target appliance is a video recorder capable of preset recording. Here, assume that the video recorder has a program preset by the user A for recording. Also assume that the terminal A has a start time of the program set by the user A as the scheduled arrival time. The control command transmission rule (E) has a message requirement that the message "late" should be received from the terminal A. This message requirement indicates that the user A will be back home later than the scheduled arrival time, that is, the start time of the desired program, by a predetermined time. Also, the control command transmission rule (E) has a control command "check preset recording". Therefore, if the message requirement of the control command transmission rule (E) has been satisfied, the control terminal 33 transmits the control command "check preset recording" to the video recorder. As such, if the user A cannot come back home at the scheduled arrival time, the video recorder can be so set as to record the program, or can be reset by a control command "cancel preset recording", which will be described later.

A control command transmission rule (F) has a message requirement that the message "too early" should be received from the terminal A. This message requirement indicates that the user A will be back home earlier than the scheduled arrival time, that is, the start time of the desired program, by a predetermined time. Also, the control command transmission rule (F) has a control command "cancel preset recording". Therefore, if the message requirement of the control command transmission rule (F) has been satisfied, the control terminal 33 transmits the control command "cancel preset recording" to the video player. As such, if the user A will be back home earlier than the scheduled arrival time, the video recorder can automatically cancel preset recording. Note that, in FIG. 13, the user B is not involved in the control of the video recorder, and therefore the message from the terminal B is not included in the control command transmission rules (E) and (F).

Figure 14:
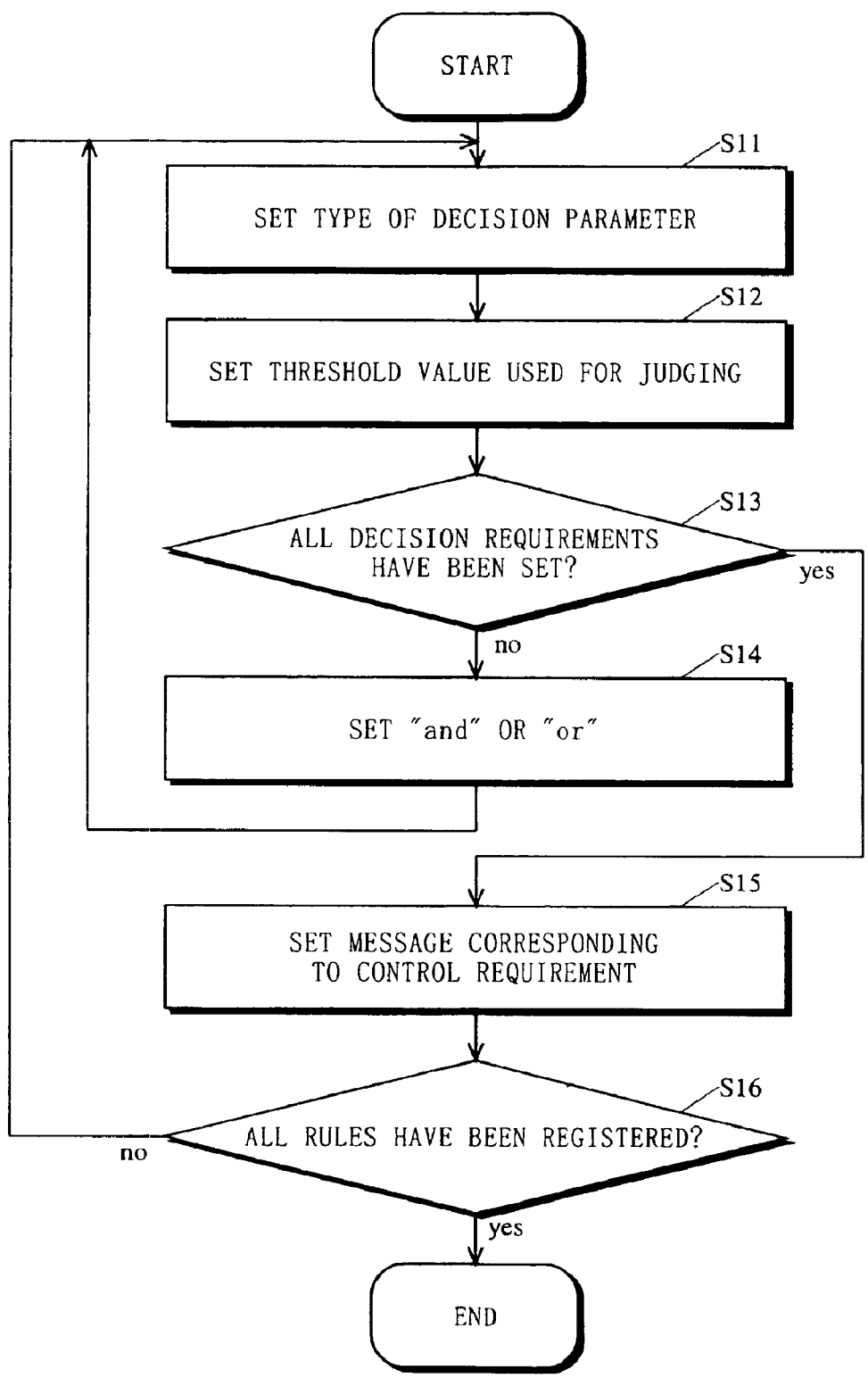
FIG. 14 is a flowchart showing the processing carried out by an information processing unit 315 of the mobile terminal 31 shown in FIG. 4 for registering message transmission rules.
Figure 15:
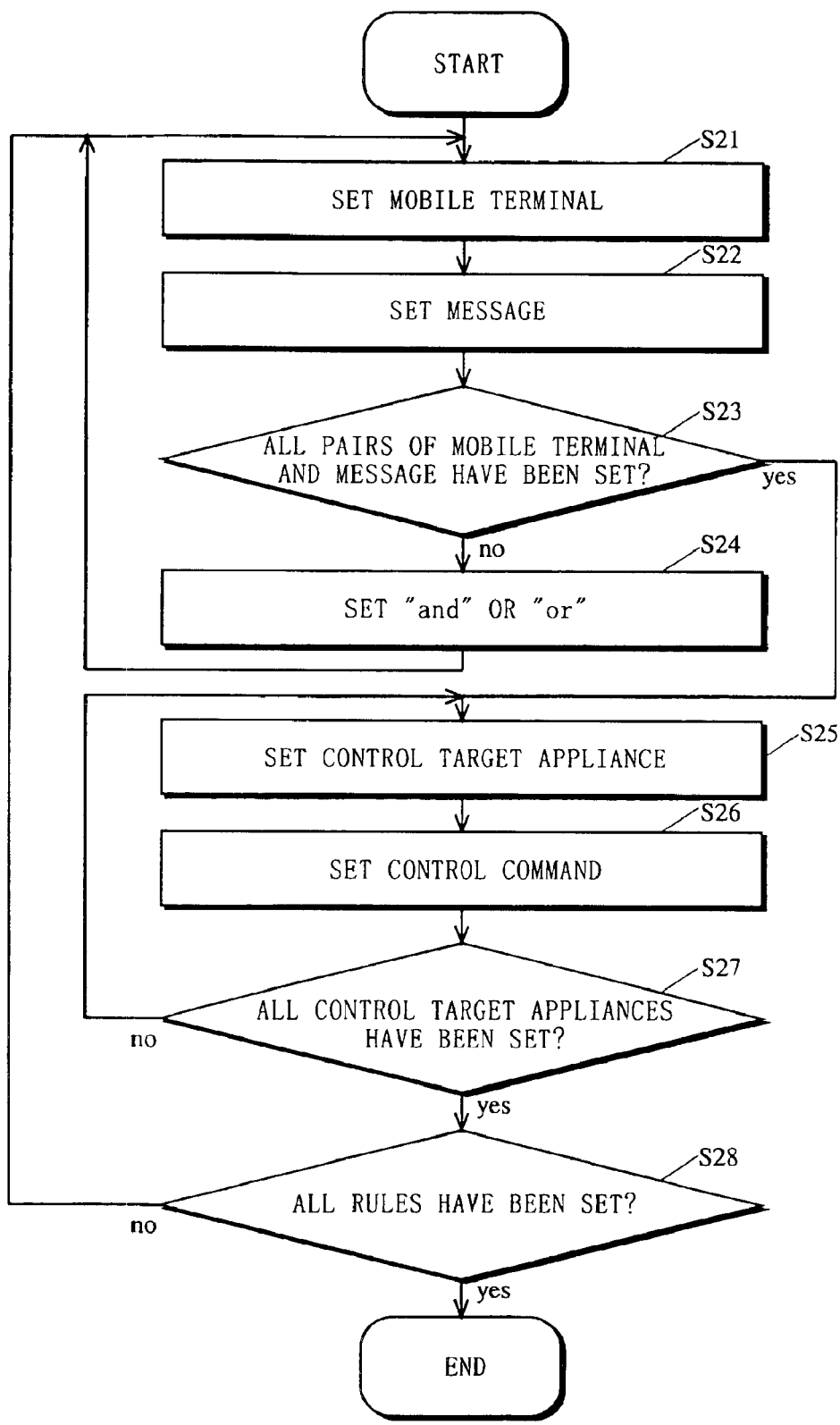
FIG. 15 is a flowchart showing the processing carried out by a control command determination unit 332 of the control terminal 33 shown in FIG. 5 for registering control command transmission rules.

Described next is preparation before automatically controlling the control target appliance 34 by using the mobile terminal 31 in the automatic remote control system according to the present embodiment. First, as the preparation, the user registers the message transmission rules in the mobile terminal 31. Also, the user registers the control command transmission rules in the control terminal 33. Here, registration of the message transmission rules and the control command transmissions rule is carried out by the user directly setting, through an input device, each item of the rules on the mobile terminal 31 or the control terminal 33. Note that registration may be carried out by using a file having a plurality of message transmission rules and control command transmission rules stored in advance. That is, for registration, the user may select any desired rules from the file having the message transmission rules and the control command transmission rules, and install the selected rules on the mobile terminal 31 and the control terminal 33. In this case, the file having the message transmission rules and the control command transmission rules stored therein is provided to the user through a storage medium such as a floppy disk or CD-ROM, or through a network such as the Internet. With reference to FIGS. 14 and 15, described below is the operation of registering the message transmission rules and the control command transmission rules.

FIG. 14 is a flowchart showing the processing carried out by the information processing unit 315 of the mobile terminal 31 shown in FIG. 4 for registering the message transmission rules. Here, setting each item is carried out by the information processing unit 315 reading a user's input from the input unit 313 for each item, and storing the read data in the message transmission rule storage 314. Described below is the operation of the information processing unit 315 for registering the message transmission rules.

First, the information processing unit 315 sets a type of decision parameter for use in judging the control requirement (step S11). Such decision parameter includes the linear distance between the current position of the mobile terminal 31 and the receiving system 32, the linear distance between the destination and the receiving system 32, the distance along the route from the current position of the mobile terminal 31 to the destination, the time left to go to the destination, the difference between the predicted arrival time and the scheduled arrival time, and others. The information processing unit 315 then sets a threshold value for use in judging the control requirement (step S12). Such threshold value may be a threshold distance when distance-related information is used as the decision parameter, or may be a threshold time when time-related information is used as the decision parameter. The information processing unit 315 then decides whether all requirements for use in decision have been set, that is, whether the control requirement has been set (step S13). The decision in step S13 is carried out by inquiring of the user through the output unit 316. That is, the information processing unit 315 inquires of the user through the output unit 316 whether the control requirement has been set, prompting the user to answer either "yes" or "no". If the answer from the user through the input unit 313 is "yes", the information processing unit 315 decides that the control requirement has been set. If the answer is "no", the information processing unit 315 decides that the control requirement has not been set. If the answer from the user is "no", the information processing unit 315 sets "and" or "or" (step S14), and the procedure repeats a series of processing of steps S11 to S13. Step S14 is provided for deciding whether the previously set requirement and a requirement subsequently set should be combined by the "and" operation or the "or" operation. If the answer is "yes" in step S13, the control requirement has been set in the message transmission rule.

If the control requirement has been set, the information processing unit 315 sets a message corresponding to the control requirement (step S15). Finally, the information processing unit 315 decides whether all message transmission rules have been registered (step S16). The decision in step S16 is carried out in a similar manner to that in step S13, by inquiring the user through the output unit 316 and receiving an answer from the user through the input unit 313. If all message transmission rules have been registered, the information processing unit 315 ends the procedure. If not all message transmission rules have been registered, the information processing unit 315 repeats a series of processing in steps S11 to S15. With the above procedure, the message transmission rules are registered.

FIG. 15 is a flowchart showing the processing carried out by a control command determination unit 332 of the control terminal 33 shown in FIG. 5 for registering control command transmission rules. Note that, in this case, the control terminal 33 has to include an input/output (I/O) interface, although not shown. Setting each item by the control command determination unit 33 as described below is carried out by the control command determination unit 33 reading a user's input from an input device for each item and transmitting the read data for each item to the control command transmission rule storage 331. Described below is the operation in the control command determination unit 332 for registering the control command transmission rule.

First of all, the control command determination unit 332 sets a mobile terminal from which a message should be received (step S21). The control command determination unit 332 then sets a message transmitted from the set mobile terminal (step S22). With these steps S21 and S22, a pair of the mobile terminal and the message is set. Moreover, the control command determination unit 332 decides whether all pairs of the mobile terminal and the message have been set, that is, whether the message requirement has been set (step S23). The decision in step S23 is carried out by an output device outputting an inquiry to the user. That is, the control command determination unit 332 inquires of the user through the output device whether the message requirement has been set, prompting the user to answer either "yes" or "no". If the answer from the user through the input device is "yes", the control command determination unit 332 decides that the message requirement has been set. If the answer is "no", the control command determination unit 332 decides that the message requirement has not been set. If the answer from the user is "no", the control command determination unit 332 sets "and" or "or" (step S24). Step S24 is provided for deciding whether the previously set pair and a pair subsequently set should be combined by the "and" operation or the "or" operation. If the answer is "yes" in step S23, the message requirement has been set.

If the message requirement has been set, the control command determination unit 332 sets a control target appliance corresponding to the message requirement (step S25). The control command determination unit 332 then sets a control command corresponding to the control target appliance (step S26). The control command determination unit 332 decides whether all control target appliances have been set (step S27). The decision in step S27 is carried out in a similar manner to that in step S23, by outputting an inquiry from the output device to the user and receiving an answer from the user through the input device. If not all control target appliances have not been set, the control command determination unit 332 repeats the processing in steps S25 and S26. On the other hand, if all control target appliances have been set, the control command determination unit 332 decides whether all control command transmission rules have been registered (step S28). The decision in step S28 is carried out in a similar manner to that in step S23, by outputting an inquiry from the output device to the user and receiving an answer from the user through the input device. If all control command transmission rules have been registered, the control command determination unit 332 ends the procedure. If not all control command transmission have been registered, the control command determination unit 332 repeats a series of processing in steps S21 to S27. With the above processing, the control command transmission rules are set.

Figure 16:
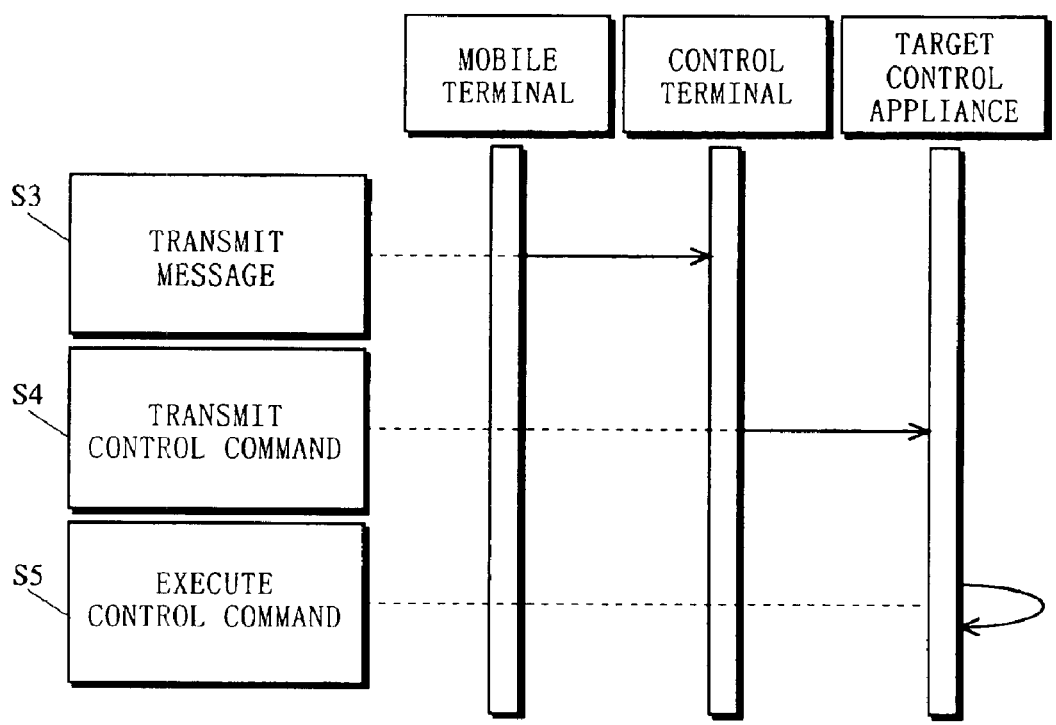
FIG. 16 is a sequence chart for demonstrating an automatic remote control operation in the automatic remote control system according to the present embodiment.

FIG. 16 is a sequence chart for demonstrating an automatic remote control operation in the automatic remote control system according to the present embodiment. First, the mobile terminal 31 judges the control requirement. If it is judged that the control requirement has been satisfied, the mobile terminal 31 transmits the message to the control terminal (step S3). Then, based on the received message, the control terminal 33 decides the message requirement. If the message requirement has been satisfied, the control terminal 33 transmits the control command to the control target appliance 34 (step S4). Finally, by following the received command, the control target appliance 34 executes the operation (step S5). With this operation, the control target appliance 34 is automatically controlled by the mobile terminal 31. With reference to FIGS. 17 to 20, described in detail below is each of the processings.

Figure 17:
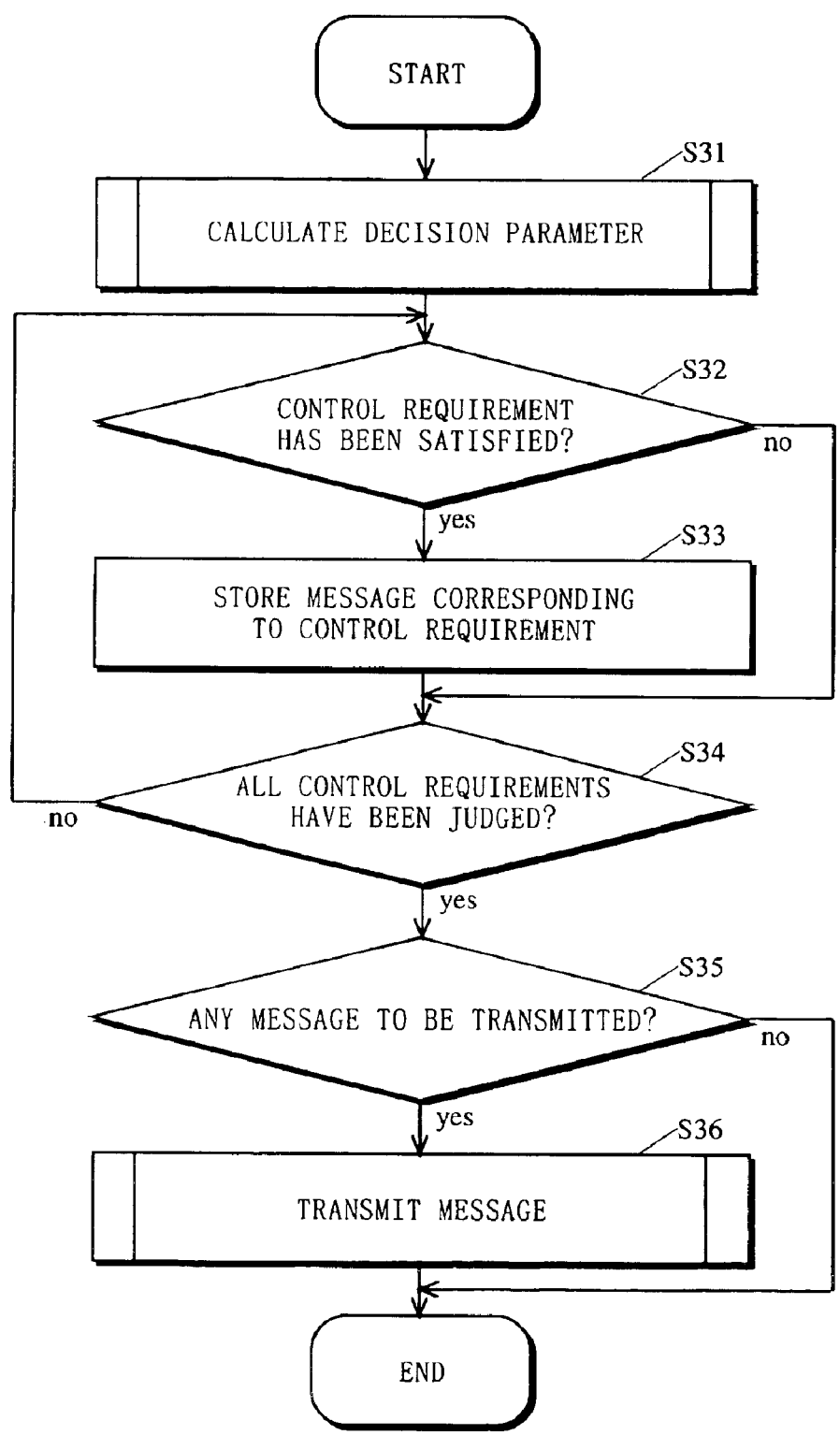
FIG. 17 is a flowchart showing the processing carried out by the information processing unit 315 of the mobile terminal 31 shown in FIG. 4 for judging a control requirement based on the current position and other factors and transmitting a message.
Figure 18:
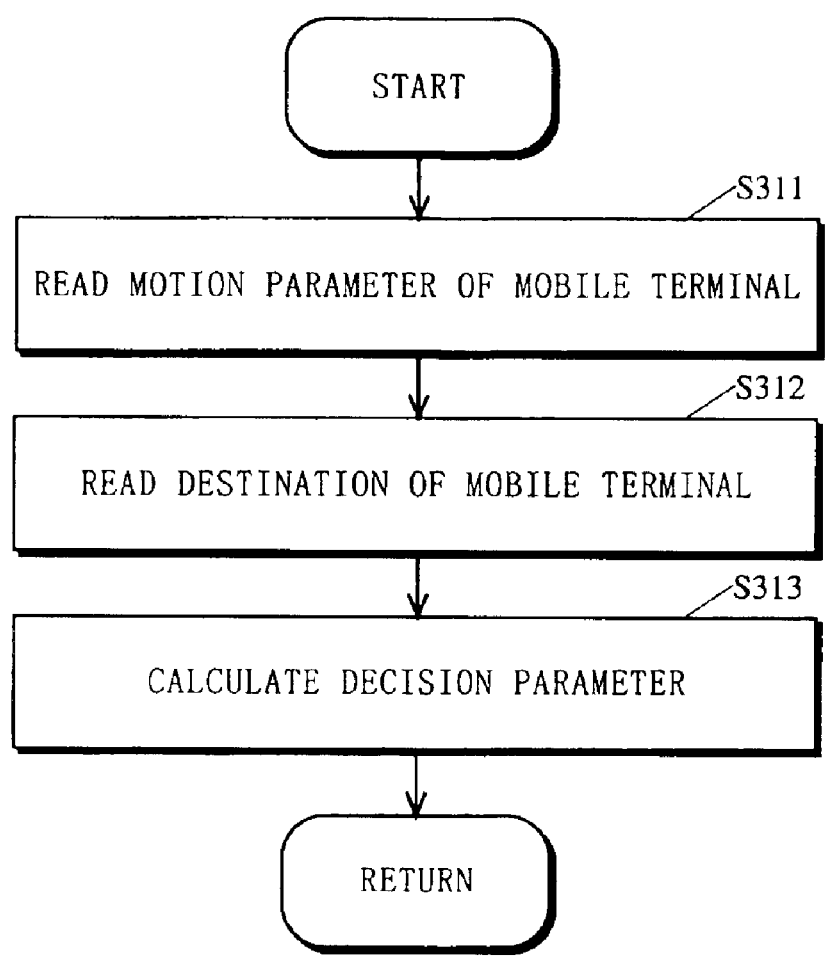
FIG. 18 is a flowchart showing step S31 of FIG. 17 in detail.
Figure 19:
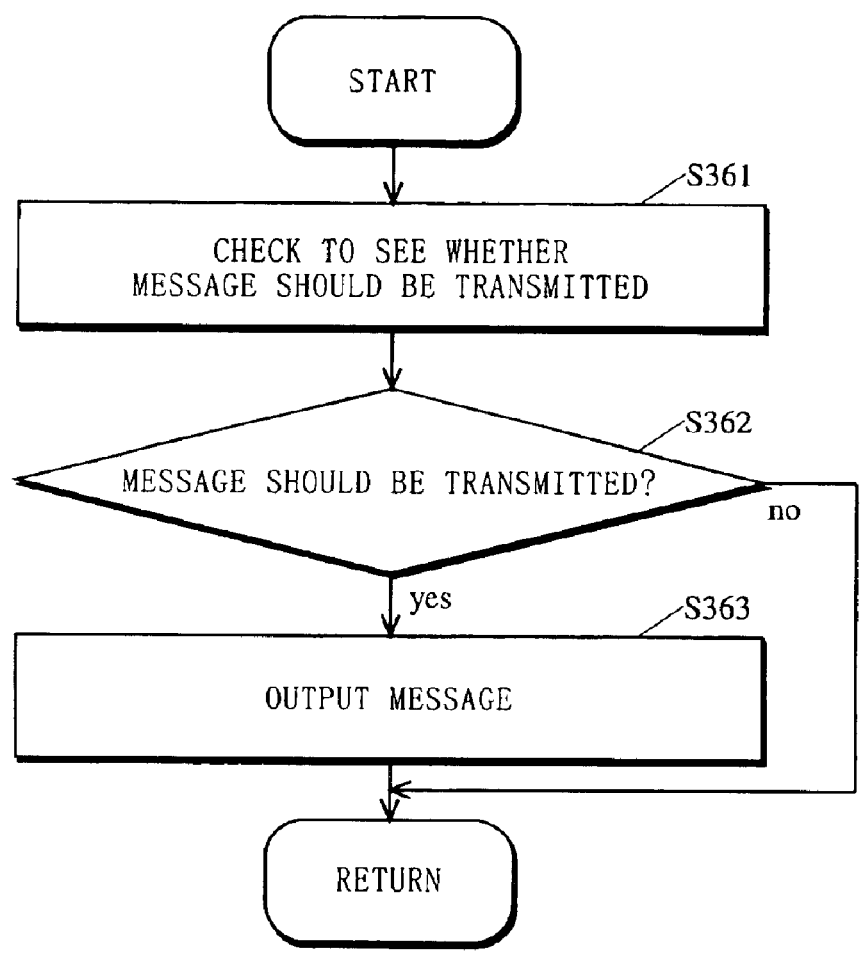
FIG. 19 is a flowchart showing step S36 of FIG. 17 in detail.

FIG. 17 is a flowchart showing the processing carried out by the information processing unit 315 of the mobile terminal 31 shown in FIG. 4 for judging the control requirement based on the current position and other factors and transmitting the message. This processing is started by the mobile terminal 31 interrupting at predetermined time intervals. First, the information processing unit 315 calculates a decision parameter required for judging the control requirement (step S31). Details of this subroutine step S31 are shown in FIG. 18. The information processing unit 315 then decides whether the control requirement has been satisfied (step S32). The decision in step S32 is carried out by inputting the message transmission rule stored in the message transmission rule storage 314 and comparing the decision parameter calculated in step S31 with the control requirement. If the control requirement has been satisfied, the information processing unit 315 stores the message that corresponds to the control requirement and came from the message transmission rule storage 314 (step S33). On the other hand, if the control requirement has not been satisfied, the information processing unit 315 does not store the message. The information processing unit 315 then decides whether it has judged the control requirements for all messages (step S34). If not judged for all messages, the information processing unit 315 repeats the processing in step S32 and S33. On the other hand, if judged for all messages, the information processing unit 315 decides whether there is any message for transmission (step S35). The message for transmission is a message stored in step S33. If any, the information processing unit 315 transmits the message (step S36), and ends the procedure. Details of step S36 are shown in FIG. 19. On the other hand, if not, the information processing unit 315 ends the procedure without transmitting any message.

FIG. 18 is a flowchart showing step S31 of FIG. 17 in detail. First, the information processing unit 315 reads data of the motion parameters detected by the motion parameter detector 312 (step S311). The information processing unit 315 then reads data of the destination set by the input unit 313 (step S312). Step S312 is provided for checking whether the user has not changed the destination. If the scheduled arrival time to the destination has been set by the input unit 313, the information processing unit 315 also reads data of the scheduled arrival time. Finally, the information processing unit 315 calculates the decision parameter (step S313). The calculation of the decision parameter in step S313 is carried out based on, for example, the data of the motion parameters read in step S311, the data of the destination and the scheduled arrival time previously set by the input unit 313, the data of the route previously found by the information processing unit 315.

FIG. 19 is a flowchart showing step S36 of FIG. 17 in detail. First, the information processing unit 315 checks whether the message should be transmitted (step S361). The check in step 361 is carried out by the output unit 316 inquiring of the user whether the message should be transmitted. In response, the user gives an answer, either "yes" or "no", through the input unit 313. The information processing unit 315 then decides, based on the answer from the user through the input unit 313, whether the message should be transmitted (step S362). If the user answers that the message should be transmitted, that is, if the user gives "yes", the information processing unit 315 outputs the message to the communications unit 317 (step S363). Outputted to the communications unit 317, the message is then transmitted from the mobile terminal 31 to the control terminal 33. On the other hand, if the user answers that the message should not be transmitted, that is, if the user gives "no", the information processing unit 315 does not output the message, and ends the procedure. If no check before transmitting the message is required, steps S361 and S362 can be skipped.

Figure 20:
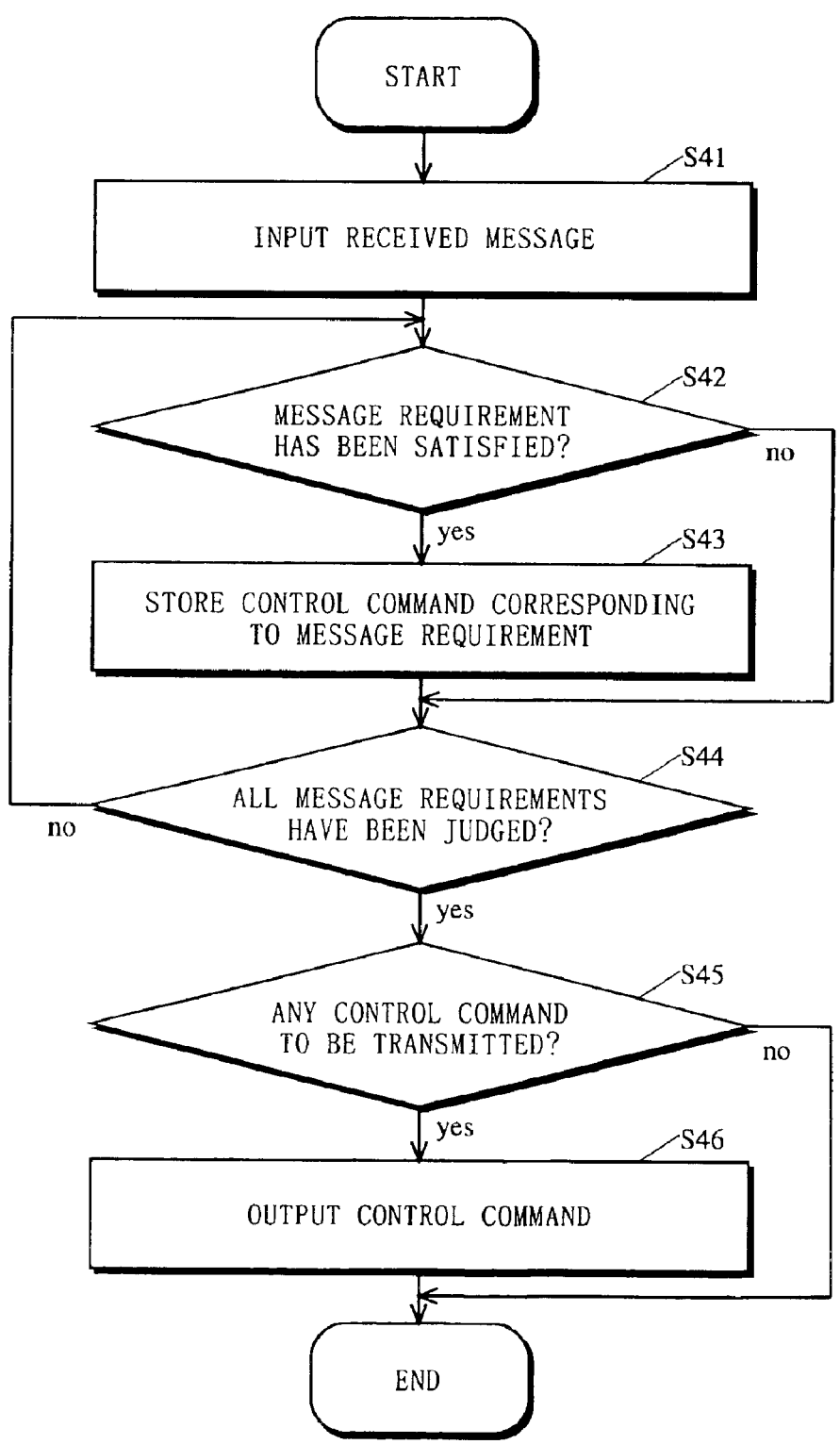
FIG. 20 is a flowchart showing the processing carried out by the control command determination unit 332 of the control terminal 33 shown in FIG. 5 for determining a control command based on a message transmitted by the mobile terminal 31 and transmitting the control command to the control target appliance 34.

FIG. 20 is a flowchart showing the processing carried out by the control command determination unit 332 of the control terminal 33 shown in FIG. 5 for determining the control command based on the message transmitted by the mobile terminal 31 and transmitting the control command to the control target appliance 34. This processing is started by the communications unit 333 of the control terminal 33 receiving the message from the mobile terminal 31. First, the control command determination unit 332 is supplied with the message received by the communications unit 333 from the control terminal 33 (step S41). The control command determination unit 332 then judges whether the message requirement has been satisfied (step S42) The judgment in step S42 is carried out by receiving the control command transmission rule stored in the control command transmission rule storage 331 and comparing the message received in step S41 with the message requirement. If the message requirement has been satisfied, the control command determination unit 332 stores the control command corresponding to the message requirement (step S43). On the other hand, if the message requirement has not been satisfied, the control command determination unit 332 does not store the control command. The control command determination unit 332 then decides whether the message requirement has been judged for all control commands (step S44). If not all, the control command determination unit 332 repeats the processing in steps S22 and S23. On the other hand, if all, the control command determination unit 332 decides whether there is any control command for transmission (step S45). The control command for transmission means the control command stored in step S43. If any, the control command determination unit 332 outputs the control command to the communications unit 333 (step S46). Outputted to the communications unit 333, the control command is then transmitted from the control terminal 33 to the control target appliance 34. On the other hand, if not in step S46, the control command determination unit 332 does not output the control command, and ends the procedure.

With the above operation, the user carrying the mobile terminal 31 can automatically remotely control the appliance without operating the mobile terminal 31. Note that, in the present embodiment, the automatic remote control system has been exemplarily described for a case of controls over the operation of the air conditioner and the preset recording of the video recorder. However, the automatic remote control system according to the present invention is not limited to the above. For example, the control target appliance 34 may be a television set at home. In this case, the system can be so constructed as that parents let their child carry the mobile terminal, and if the child approaches a station nearest their home, they are notified by a message displayed on the television set saying "go picking up your child". Alternatively, the control target appliance 34 may be a surveillance camera installed at home. In this case, the system can be so constructed as that, when the user carrying the mobile terminal is approaching home, the camera shoots inside home and transmits images to the mobile terminal. Furthermore, the control target appliance 34 is not limited to an electric home appliance, but may be a door to a garage. In this case, the system can be so constructed as that the door opens as a user's car is approaching the garage. Alternatively, the control target appliance 34 may be a personal computer at an office. In this case, the system can be so constructed as that as the user is approaching the office, the personal computer automatically downloads news, enabling the user to read it as soon as he/she gets to the office.

While the invention has been described in detail, the foregoing description is in all aspects illustrative and not restrictive. It is understood that numerous other modifications and variations can be devised without departing from the scope of the invention.

What is claimed is:

1. A mobile terminal capable of communicating through a network with a receiving system including at least one control target appliance and of remotely controlling the control target appliance by transmitting a message to the receiving system, said mobile terminal comprising:

a message transmission rule storage operable to store at least one message transmission rule indicating a correspondence between a control requirement for remotely controlling the control target appliance and a message to be transmitted for remote control;

a motion parameter detector operable to detect a motion parameter indicating at least one parameter selected from the group consisting of a position, speed, and direction of said mobile terminal;

a control requirement judging device operable to judge whether the control requirement in the message transmission rule has been satisfied based on the motion parameters detected by said motion parameter detector; and a transmitter operable to transmit, when said control requirement judging device judges that the control requirement in the message transmission rule has been satisfied, the message corresponding to the control requirement to the receiving system by reading the message from said message transmission rule storage.

2. The mobile terminal according to claim 1, further comprising a setter operable to set a destination specified by a user, wherein said control requirement judging device is operable to judge whether the control requirement has been satisfied only when a position of the receiving system matches the destination set by said setter.

3. The mobile terminal according to claim 2, further comprising:

a cartographic information storage operable to store cartographic information; and a route searcher operable to search a route on a map from a starting point to the destination set by said setter, wherein said control requirement judging device is operable to judge whether the control requirement in the message transmission rule has been satisfied based on the motion parameter and the route found by said route searcher.

4. The mobile terminal according to claim 3, wherein said control requirement includes a predetermined distance, and said control requirement judging device is operable to calculate a remaining distance on the found route from a current position to the destination, and to judge whether the control requirement has been satisfied based on whether the remaining distance becomes shorter than the predetermined distance included in the control requirement.

5. The mobile terminal according to claim 3, wherein the control requirement includes a predetermined time, and said control requirement judging device is operable to predict a time left to go to the destination while taking the found route, and to judge whether the control requirement has been satisfied based on whether the predicted time is shorter than the predetermined time included in the control requirement.

6. The mobile terminal according to claim 3, wherein said setter is operable to set the destination and a scheduled arrival time to the destination both specified by the user, the control requirement includes a predetermined distance and a predetermined time, and said control requirement judging device is operable to calculate a distance from a current position to the destination on the found route, calculate a time difference between a current time and the scheduled arrival time set by said setter, and judge whether the control requirement has been satisfied based on whether the calculated distance and the calculated time difference respectively have a predetermined relation with the predetermined distance and the predetermined time included in the control requirement.

7. The mobile terminal according to claim 3, wherein
said setter is operable to set the destination and a scheduled arrival time to the destination both specified by the user,
the control requirement includes a predetermined time, and
said control requirement judging device is operable to
predict an arrival time to the destination while taking the found route,
calculate a time difference between the predicted arrival time and the scheduled arrival time set by said setter, and
judge whether the control requirement has been satisfied based on whether the calculated time difference has a predetermined relation with the predetermined time included in the control requirement.

8. The mobile terminal according to claim 1, further comprising:
an output device operable to output to a user a visual and/or audio inquiry about whether said transmitter is to transmit the message; and
an answer receiver operable to receive an answer from the user to the inquiry outputted by said output device, wherein
said transmitter is operable to transmit the message when the user answers that the message is to be transmitted.

9. An automatic remote control system comprising:
a mobile terminal comprising a message transmission rule storage, a motion parameter detector, a control requirement judging device, and a transmitter; and
a receiving system comprising a receiver, an executing unit and a control target appliance,
wherein a predetermined message is transmitted through a network from said mobile terminal to said receiving system for remotely controlling said control target appliance,
wherein said message transmission rule storage is operable to store at least one message transmission rule indicating a correspondence between a control requirement for remotely controlling said control target appliance and a message to be transmitted for remote control,
wherein said motion parameter detector is operable to detect a motion parameter indicating at least one parameter selected from the group consisting of a position, speed, and direction of said mobile terminal,
wherein said control requirement judging device is operable to judge whether the control requirement in the message transmission rule has been satisfied based on the motion parameter detected by said motion parameter detector,
wherein said transmitter is operable to transmit, when said control requirement judging device judges that the control requirement in the message transmission rule has been satisfied, the message corresponding to the control requirement to said receiving system by reading the message from said message transmission rule storage,
wherein said receiver is operable to receive the message from said mobile terminal, and
wherein said executing unit is operable to make said control target appliance execute an operation based on the message received by said receiver.

10. The automatic remote control system according to claim 9, wherein
said executing unit includes:
a control command transmission rule storage operable to store a control command transmission rule for determining, based on the message received by said receiver, a control command indicating an instruction for operating said control target appliance;
a control command determination unit operable to determine the control command corresponding to the message received by said receiver by following the control command transmission rule; and
an execution controller operable to make said control target appliance execute the operation based on the control command determined by said control command determination unit.

11. The automatic remote control system according to claim 9, further comprising:
a control command determination unit,
wherein the message transmitted from said transmitter is provided with identification information for identifying said mobile terminal that transmitted the message,
wherein the control command transmission rule is so described as that the control command is determined based on the message and the identification information both received by said receiver, and
wherein said control command determination unit determines the control command corresponding to the message and the identification information both received by said receiver by following the control command transmission rule.

12. The automatic remote control system according to claim 9, wherein
said mobile terminal further includes a setter operable to set a destination specified by a user, and
said control requirement judging device is operable to judge whether the control requirement has been satisfied when a position of said receiving system matches the destination set by said setter.

13. The automatic remote control system according to claim 12, wherein said mobile terminal further includes:
a cartographic information storage operable to store cartographic information; and
a route searcher operable to search a route on a map from a starting point to the destination set by said setter, wherein
said control requirement judging device is operable to judge whether the control requirement in the message transmission rule has been satisfied based on the motion parameter and the route found by said route searcher.

14. The automatic remote control system according to claim 13, wherein
the control requirement includes a predetermined distance, and
said control requirement judging device is operable to calculate a remaining distance on the found route from a current position to the destination, and to judge whether the control requirement has been satisfied based on whether the remaining distance becomes shorter than the predetermined distance included in the control requirement.

15. The automatic remote control system according to claim 13, wherein the control requirement includes a predetermined time, and said control requirement judging device is operable to predict a time left to go to the destination while taking the found route, and to judge whether the control requirement has been satisfied based on whether the predicted time is shorter than the predetermined time included in the control requirement.

16. The automatic remote control system according to claim 13, wherein said setter is operable to set the destination and a scheduled arrival time to the destination both specified by the user, the control requirement includes a predetermined distance and a predetermined time, and said control requirement judging device is operable to calculate a distance from a current position to the destination on the found route, calculate a time difference between a current time and the scheduled arrival time set by said setter, and judge whether the control requirement has been satisfied based on whether the calculated distance and the calculated time difference respectively have a predetermined relation with the predetermined distance and the predetermined time included in the control requirement.

17. The automatic remote control system according to claim 13, wherein said setter is operable to set the destination and a scheduled arrival time to the destination both specified by the user, the control requirement includes a predetermined time, said control requirement judging device is operable to predict an arrival time to the destination while taking the found route, calculate a time difference between the predicted arrival time and the scheduled arrival time set by said setter, and judge whether the control requirement has been satisfied based on whether the calculated time difference has a predetermined relation with the predetermined time included in the control requirement.

18. The automatic remote control system according to claim 9, further comprising:

an output device operable to output to a user a visual and/or audio inquiry about whether said transmitter is to transmit the message; and an answer receiver operable to receive an answer from the user to the inquiry outputted by said output device, wherein said transmitter is operable to transmit the message when the user answers that the message is to be transmitted.

19. An automatic control method for remotely controlling a control target appliance included a receiving system by transmitting a predetermined message through a network from a mobile terminal to the receiving system, the mobile terminal previously storing at least one message transmission rule indicating a correspondence between a control requirement for remotely controlling the control target appliance and the message to be transmitted for remote control, said method comprising:

detecting, by the mobile terminal, a motion parameter indicating at least one parameter selected from the group consisting of a position, speed, and direction of the mobile terminal;

judging, by the mobile terminal, whether the control requirement in the message transmission rule has been satisfied based on the detected motion parameter;

transmitting, by the mobile terminal, when it is judged that the control requirement in the message transmission rule has been satisfied, the message corresponding to the control requirement to the receiving system by reading the message from the message transmission rule; and making, by the receiving system, the control target appliance execute an operation based on the message received from the mobile terminal.

* * * * *